US011944592B2

(12) United States Patent
Koike et al.

(10) Patent No.: US 11,944,592 B2
(45) Date of Patent: Apr. 2, 2024

(54) TABLET CASSETTE ROTOR AND TABLET CASSETTE

(71) Applicant: YUYAMA MFG. CO., LTD., Osaka (JP)

(72) Inventors: Naoki Koike, Osaka (JP); Ryosuke Fukamori, Osaka (JP)

(73) Assignee: YUYAMA MFG. CO., LTD., Osaka (JP)

(*) Notice: Subject to any disclaimer, the term of this patent is extended or adjusted under 35 U.S.C. 154(b) by 0 days.

(21) Appl. No.: 17/031,708

(22) Filed: Sep. 24, 2020

(65) Prior Publication Data

US 2021/0007936 A1 Jan. 14, 2021

Related U.S. Application Data

(63) Continuation of application No. 15/735,952, filed as application No. PCT/JP2017/011300 on Mar. 22, 2017, now Pat. No. 10,828,237.

(30) Foreign Application Priority Data

Mar. 25, 2016 (JP) ................................ 2016-062889
Sep. 16, 2016 (JP) ................................ 2016-181237

(51) Int. Cl.
*A61J 7/00* (2006.01)
*A61J 3/00* (2006.01)

(52) U.S. Cl.
CPC ............... *A61J 7/0076* (2013.01); *A61J 3/00* (2013.01)

(58) Field of Classification Search
CPC ....... A61J 3/00; A61J 7/0076; G07F 17/0092; B65B 35/08; B65B 59/00

(Continued)

(56) References Cited

U.S. PATENT DOCUMENTS 3,741,703 A * 6/1973 Reynolds .................. B29B 9/00 425/222
4,588,366 A * 5/1986 Glatt .......................... B01J 2/16 264/117

(Continued)

FOREIGN PATENT DOCUMENTS

CN 103501752 A 1/2014
EP 1285850 A2 2/2003

(Continued)

OTHER PUBLICATIONS

CNIPA, Chinese Office Action dated Feb. 7, 2021 in Chinese Application No. 201780001857.7, 8 pages.

(Continued)

*Primary Examiner* — Rakesh Kumar
(74) *Attorney, Agent, or Firm* — MASUVALLEY & PARTNERS; Peter Martinez

(57) ABSTRACT

A rotor having a plurality of tablet guide paths is rotatably contained in a cassette main body. The rotor facing an inverse conical-shaped inclined inner surface of the cassette main body includes an inclined outer surface in each of the plurality of tablet guide paths. A distance between the inverse conical-shaped inclined inner surface of the cassette main body and the inclined outer surface of the table guide path can be adjusted by raising and lowering the rotor with respect to the cassette main body. A distance between a partitioning member and a tablet support table can be adjusted by raising and lowering the tablet support table provided on a lower side of the partitioning member. A distance between a first vertical protruding piece and a second vertical protruding piece constituting the tablet guide path can be adjusted by relatively rotating a first movable member and a second movable member.

4 Claims, 31 Drawing Sheets

(58) Field of Classification Search
USPC .......................................................... 221/187
See application file for complete search history.

(56) References Cited

U.S. PATENT DOCUMENTS

| | | | | |
|---|---|---|---|---|
| 4,946,359 | A * | 8/1990 | Christen .................... | B01J 2/10 425/222 |
| 5,026,709 | A * | 6/1991 | Harwood ................ | A61J 3/005 514/263.34 |
| 5,700,497 | A * | 12/1997 | Stone ......................... | B01J 2/18 209/252 |
| 6,119,737 | A | 9/2000 | Yuyama et al. | |
| 6,394,308 | B1 * | 5/2002 | Yuyama ............. | B65G 47/1457 221/265 |
| 6,786,356 | B2 * | 9/2004 | Geiger .................... | A47J 31/60 99/290 |
| 7,051,900 | B2 * | 5/2006 | Reeves ................... | F41B 11/55 124/44.7 |
| 7,751,933 | B2 | 7/2010 | Handfield et al. | |
| 7,857,162 | B2 * | 12/2010 | Minami ............. | B65G 47/1457 221/168 |
| 8,430,269 | B2 * | 4/2013 | Nam ....................... | B65B 35/08 221/265 |
| 9,004,315 | B2 * | 4/2015 | Yuyama ................. | B65G 47/14 221/277 |
| 9,155,681 | B2 * | 10/2015 | Yuyama .............. | G07F 17/0092 |
| 9,238,545 | B2 * | 1/2016 | Bae ......................... | G07F 11/44 |
| 10,232,961 | B2 * | 3/2019 | Kim .......................... | B65B 1/04 |
| 2002/0083543 | A1 | 7/2002 | Geiger et al. | |
| 2003/0038143 | A1 | 2/2003 | Hashimoto et al. | |
| 2008/0029537 | A1 | 2/2008 | Minami et al. | |
| 2011/0163112 | A1 * | 7/2011 | Takahama ........... | G07F 17/0092 221/277 |
| 2013/0284755 | A1 * | 10/2013 | Yuyama ................ | A61J 7/0084 221/277 |
| 2014/0014678 | A1 * | 1/2014 | Yuyama .............. | G07F 17/0092 221/277 |
| 2015/0027286 | A1 * | 1/2015 | Yuyama ................. | B65D 83/04 83/105 |
| 2015/0224030 | A1 | 8/2015 | Koike et al. | |
| 2016/0000655 | A1 | 1/2016 | Yuyama et al. | |
| 2016/0371916 | A1 * | 12/2016 | Omura ................ | G07F 17/0092 |
| 2018/0161247 | A1 | 6/2018 | Koike et al. | |
| 2019/0053984 | A1 | 2/2019 | Yuyama et al. | |
| 2021/0007936 | A1 * | 1/2021 | Koike ................... | A61J 7/0076 |

FOREIGN PATENT DOCUMENTS

| | | | | | |
|---|---|---|---|---|---|
| EP | 3235737 | A1 | | 10/2017 | |
| EP | 3235737 | A1 | * | 10/2017 | ................ A61J 3/07 |
| EP | 3235737 | A4 | * | 8/2018 | ................ A61J 3/07 |
| JP | H06-76225 | U | | 10/1994 | |
| JP | 2002-203502 | A | | 7/2000 | |
| JP | 2000203502 | A | * | 7/2000 | ............. B65B 35/08 |
| JP | 2007-202795 | A | | 8/2007 | |
| JP | 2010-168110 | A | | 8/2010 | |
| JP | 2016-026059 | A | | 2/2016 | |
| JP | WO2017164196 | A1 | * | 3/2018 | ................ A61J 3/00 |
| TW | 201223520 | A | | 6/2012 | |
| TW | 201228889 | A | | 7/2012 | |
| TW | 201235034 | A | | 9/2012 | |
| TW | 201524498 | A | | 7/2015 | |
| WO | WO 2005/097600 | A1 | | 10/2005 | |
| WO | WO2012/096328 | A1 | | 7/2012 | |
| WO | WO-2012096328 | A1 | * | 7/2012 | ............ A61J 7/0076 |
| WO | WO-2016099094 | A1 | * | 6/2016 | ................ A61J 3/07 |
| WO | WO-2017164196 | A1 | | 9/2017 | |
| WO | WO-2017164196 | A1 | * | 9/2017 | ................ A61J 3/00 |

OTHER PUBLICATIONS

Japanese Office Action dated Jan. 5, 2021, for Japanese Application No. 2018-043220, 6pages.
ISA/JPO, International Search Report issued in PCT/JP2017/011300, dated Jun. 10, 2017, total 10 pages with English translation.
EPO, Supplementary European Search Report dated Jan. 29, 2019 in European Application No. EP 17 77 0238, 5 pages.
Taiwanese Office Action and Search Report dated Nov. 12, 2020, for Taiwanese Application No. 106108610, 4pages.
JP Office Action dated Jan. 4, 2022, in JP2021-071140 (4 pages).
Japan Paten Office, Japanese Office Action dated Nov. 1, 2022 in Japanese Application No. 2022-066088, 3 pages.

* cited by examiner

TABLET CASSETTE ROTOR AND TABLET CASSETTE

RELATED APPLICATIONS

This application is a continuation of and claims priority to U.S. patent application Ser. No. 15/735,952 filed Dec. 12, 2017 entitled Tablet Cassette Rotor And Tablet Cassette, which is a U.S. National Phase application under 35 U.S.C. § 371 of International Application No. PCT/JP2017/011300, filed on Mar. 22, 2017, entitled Tablet Cassette Rotor And Tablet Cassette, which claims priority under 35 U.S.C. § 119 to Japanese Application No. 2016/062889, filed on Mar. 25, 2016, and Japanese Application No. 2016-181237, filed on Sep. 16, 2016, all of which are hereby expressly incorporated herein by reference in their entireties for all purposes.

TECHNICAL FIELD

The present invention relates to a tablet cassette included in a tablet containing and dispensing apparatus, in particular to a rotor for a tablet cassette for containing a plurality of tablets and taking the tablets by a required number according to a prescription and a tablet cassette using this rotor.

BACKGROUND OF THE DISCLOSURE

A tablet containing and dispensing apparatus erected in a dispensing pharmacy or a hospital can rapidly, reliably and safely provide a plurality of patients with tablets according to a prescription automatically. Although the tablet contains a variety of tablets with various shapes such as a circular shape, an oval shape, a spherical shape, a capsule shape and a sugar-coated shape and various sizes, it is preferable that the tablet containing and dispensing apparatus can dispense as many kinds of tablets as possible.

The tablet containing and dispensing apparatus includes a plurality of tablet cassettes which can contain and dispense different kinds of tablets. Each tablet cassette is constituted of a cassette main body for containing the tablets and a rotor arranged on a bottom of the cassette main body so as to rotatably drive. When the rotor rotates, the tablets in the cassette main body are guided into a plurality of tablet guide paths formed on the rotor in sequence. When each tablet guide path coincides with a tablet discharging hole of the cassette main body, a tablet at a lowest portion of the tablet guide path and the tablets above the lowest tablet are partitioned by a partitioning member and only the lowest tablet is discharged from the tablet discharging hole.

The applicant proposes a tablet cassette which can change a width and a depth of a tablet guide path of a rotor depending on a kind of a tablet in patent document 1. The tablet cassette of the patent document 1: WO 2012/096328A has a movable piece moving mechanism for moving a movable piece forming a surface of the tablet guide path in a depth direction thereof in a radial direction of the rotor, a width adjusting mechanism for relatively moving a first movable member and a second movable member each having a side wall forming a surface of the tablet guide path in a width direction thereof in a circumferential direction of the rotor and a tablet partitioning mechanism in which a plurality of tablet pressing members are provided along the tablet guide path and which holds tablets positioned above a lowest tablet by pressing any one of the tablet pressing members with a pressing member to discharge only the lowest tablet. Since the tablet cassette of the patent document 1 can adjust the depth, the width and a partitioning position of the tablet guide path, it is possible to treat various tablets having various shapes and sizes.

SUMMARY OF THE INVENTION

It is an object of the present invention to further improve the rotor of the tablet cassette of the patent document 1 and provide a tablet cassette rotor and a tablet cassette whose number of components is small and which can treat tablets having more various shapes and sizes and is adaptable to an automatic adjustment for a depth, a width and a partitioning position of a tablet guide path.

As first means to solve the above-described problem, the present invention provides:

a rotor which is rotatably contained in a cassette main body for containing tablets and has a plurality of tablet guide paths for guiding the tablets in the cassette main body to a tablet discharging hole provided in the cassette main body, the rotor comprising:

an inclined outer surface provided in the tablet guide path so as to be inclined with respect to a rotational axis of the rotor and face an inverse conical-shaped inclined inner surface of the cassette main body; and a rotor raising and lowering mechanism for raising and lowering at least the inclined outer surface of the rotor with respect to the cassette main body in a rotational axis direction of the rotor, wherein a distance between the inverse conical-shaped inclined inner surface of the cassette main body and the inclined outer surface of the tablet guide path can be adjusted by raising and lowering at least the inclined outer surface of the rotor with the rotor raising and lowering mechanism.

In the first means, when at least the inclined outer surface of the rotor is raised by the rotor raising and lowering mechanism, the distance between the inverse conical-shaped inclined inner surface of the cassette main body and the inclined outer surface of the tablet guide path increases. On the other hand, when at least the inclined outer surface of the rotor is lowered by the rotor raising and lowering mechanism, the distance between the inverse conical-shaped inclined inner surface of the cassette main body and the inclined outer surface of the tablet guide path decreases. Thus, by raising and lowering the rotor depending on a thickness of the tablet, it is possible to adjust the distance between the inverse conical-shaped inclined inner surface of the cassette main body and the inclined outer surface of the tablet guide path, that is a depth of the tablet guide path.

It is preferable that the rotor includes and is constituted of a rotor base and a rotor main body which is provided on the rotor base so that the rotor main body can move in the rotational axis direction of the rotor and rotate around a rotational axis of the rotor integrally with the rotor base and which has the inclined outer surface, wherein the rotor raising and lowering mechanism is constituted of:

a screw hole provided on the rotational axis of the rotor at the rotor main body, and a thickness adjusting member which is screwed with the screw hole of the rotor main body and whose one end contacts with the rotor base and the other end is exposed from the rotor main body, and wherein at least the inclined outer surface of the rotor main body is raised and lowered.

According to this invention, it is possible to raise and lower the rotor main body having the screw hole screwed with the thickness adjusting member by rotating the thickness adjusting member in a left-right direction.

As second means, the present invention provides:

a rotor which is rotatably contained in a cassette main body for containing tablets and has a plurality of tablet guide paths for guiding the tablets in the cassette main body to a tablet discharging hole provided in the cassette main body and in which a lowest tablet is partitioned from upper tablets among the tablets aligned in the tablet guide path by a partitioning member provided on the upper side of the tablet discharging hole of the cassette main body, the rotor comprising:
- a tablet support table for supporting the lowest tablet in the tablet guide path; and
- a tablet support table raising and lowering mechanism for raising and lowering the tablet support table,
- wherein a distance between the partitioning member and the tablet support table can be adjusted by the tablet support table raising and lowering mechanism.

In the second means, when the tablet support table is raised by the tablet support table raising and lowering mechanism, the distance between the partitioning member of the cassette main body and the tablet support table decreases. On the other hand, when the tablet support table is lowered by the tablet support table raising and lowering mechanism, the distance between the partitioning member and the tablet support table increases. Thus, it is possible to adjust the distance between the partitioning member and the tablet support table, that is the partitioning position of the tablet guide path without changing a position of the partitioning member fixed to the cassette main body by raising and lowering the tablet support table depending on a height of the tablet.

It is preferable that the rotor is constituted of a rotor base and a rotor main body provided so as to rotate around a rotational axis of the rotor integrally with the rotor base, wherein the tablet support table raising and lowering mechanism is constituted of:
- a rotating member which is provided on the rotor base and in which a screw portion is formed on an outer circumferential lower portion of the rotating member and a driven gear is formed on an inner circumferential upper portion,
- a raising and lowering member which is provided on the rotor base so that the raising and lowering member can be raised and lowered and has the tablet support table and a screw hole screwed with the screw portion of the rotating member, and
- a height adjusting member whose driving gear on one end thereof is meshed with the driven gear of the rotating member and the other end is exposed from the rotor main body.

According to this invention, it is possible to allow the driven gear of the height adjusting member to rotate the rotating member through the driven gear of the rotating member when the height adjusting member rotates in a left-right direction to raise and lower the tablet support table of the raising and lowering member having the screw hole screwed with the screw portion of the rotating member.

As third means, the present invention provides:

a rotor which is rotatably contained in a cassette main body for containing tablets and has a plurality of tablet guide paths for guiding the tablets in the cassette main body to a tablet discharging hole provided in the cassette main body, the rotor comprising:
- a first movable member having a first vertical portion forming one of side walls of the tablet guide path and a first horizontal portion extending from an upper end of the tablet guide path toward the tablet guide path adjacent thereto,
- a second movable member having a second vertical portion forming the other one of the side walls of the tablet guide path and a second horizontal portion extending from the upper end of the tablet guide path toward the tablet guide path adjacent thereto,
- a first support member arranged on the first movable member,
- a second support member arranged under the second movable member, and
- a movable member moving mechanism for relatively rotating the first movable member and the second movable member,
- wherein a distance between the first vertical portion and the second vertical portion can be adjusted by the movable member moving mechanism.

In the third means, when the first movable member and the second movable member are rotated by the movable member moving mechanism so that the first vertical portion of the first movable member and the second vertical portion of the second movable member relatively approach to each other, a left-right width of the tablet guide path decreases. Further, when the first movable member and the second movable member are rotated so that the first vertical portion of the first movable member and the second vertical portion of the second movable member are relatively separated away from each other, the left-right width of the tablet guide path increases. Thus, by relatively rotating the first movable member and the second movable member depending on a size of the tablet, it is possible to adjust the distance between the first vertical portion and the second vertical portion, that is the width of the tablet guide path.

It is preferable that the movable member moving mechanism is constituted of:
- a cam member rotatably arranged between the first movable member and the second movable member and having a driven gear,
- an adjusting hole provided in at least one of the first movable member and the second movable member,
- a first guide hole provided in the first support member and extending in a center line of an angle crossing the adjusting hole,
- a second guide hole provided in the second support member and coinciding with the first guide hole,
- a driving pin fitted in the adjusting hole, the first guide hole and the second guide hole,
- a cam groove formed on the cam member and into which the driving pin is fitted, and
- a width adjusting member whose driving gear on one end thereof is meshed with the driven gear of the cam member and the other end is exposed from the rotor main body.

Further, it is preferable that the movable member moving mechanism is constituted of:
- a cam member rotatably arranged between the first movable member and the second movable member and having a driven gear,
- a first adjusting hole provided in the first movable member,
- a second adjusting hole provided in the second movable member and crossing the first adjusting hole, a first guide hole provided in the first support member and extending in a center line of an angle crossing the first adjusting hole and the second adjusting hole, a second guide hole provided in the second support member and coinciding with the first guide hole, a driven pin fitted in the first adjusting hole, the second adjusting hole, the first guide hole and the second guide hole, a cam groove formed on the cam member and into which the driven pin is fitted, and a width adjusting member whose driving gear on one end thereof is meshed with the driven gear of the cam member and the other end is exposed from the rotor main body.

According to this invention, when the width adjusting member rotates in the left-right direction, the cam member rotates and a cam of the cam member moves the driving pin in a radial direction of the rotor. Thus, the driving pin presses the first adjusting hole to rotate the first movable member in one direction and the driving pin presses the second adjusting hole to rotate the second movable member in the other direction. This makes it possible to relatively rotate the first movable member and the second movable member.

It is preferable that the movable member moving mechanism is constituted of:

a segment worm gear provided on at least one of the first movable member and the second movable member, a transmission axis having a driven bevel gear and a worm meshed with the segment worm gear, and a width adjusting member which has a driving bevel gear meshed with the driven bevel gear on one end thereof and whose other end is exposed from the rotor main body.

Further, it is preferable that the movable member moving mechanism is constituted of:

a first segment worm gear provided on the first movable member, a second worm gear provided on the second movable member, a first transmission axis having a first driven bevel gear and a first worm meshed with the first segment worm gear, a second transmission axis having a second driven bevel gear and a second worm meshed with the second segment worm gear, and a width adjusting member which has a driving bevel gear meshed with the first driven bevel gear and the second driven bevel gear on one end thereof and whose other end is exposed from the rotor main body.

According to this invention, when the width adjusting member rotates in the left-right direction, the first worm rotates through the first driven bevel gear and the second worm rotates through the second driven bevel gear to relatively rotate the first movable member and the second movable member through the first segment worm gear and the second segment worm gear, respectively.

It is preferable that the movable member moving mechanism is constituted of:

a segment gear provided on at least one of the first movable member and the second movable member, and a width adjusting mechanism which has a driving gear meshed with the segment gear on one end thereof and whose other end is exposed from the rotor main body.

Further, it is preferable that the movable member moving mechanism is constituted of:

a first segment gear provided on the first movable member, a second segment gear provided on the second movable member, and a width adjusting member which has a first driving gear meshed with the first segment gear and a second driving gear meshed with the second segment gear on one end thereof and whose other end is exposed from the rotor main body.

According to this invention, by rotating the width adjusting member in the left-right direction, it is possible to relatively rotate the first movable member and the second movable member through the first segment gear and the second segment gear.

The driving gear of the width adjusting member can be finely adjusted by meshing the driving gear of the width adjusting member with the segment gear through a reduction gear, thereby improving a resolution performance.

It is preferable that the movable member moving mechanism is constituted of:

an A protrusion and a B protrusion provided on at least one of the first movable member and the second movable member, and a width adjusting member which has an A cam slidably contacting with the A protrusion and a B cam slidably contacting with the B protrusion on one end thereof and whose other end is exposed from the rotor main body.

Further, it is preferable that the movable member moving mechanism is constituted of:

an A protrusion and a B protrusion provided on the first movable member, an A protrusion and a B protrusion provided on the second movable member, and a width adjusting member which is constituted of a first adjusting axis having an A cam slidably contacting with the A protrusion of the first movable member and a B cam slidably contacting with the B protrusion of the first movable member and a second adjusting axis having an A cam slidably contacting with the A protrusion of the second movable member and a B cam slidably contacting with the B protrusion of the second movable member, wherein the first adjusting axis and the second adjusting axis interlock with each other.

According to this invention, when one of the first adjusting axis and the second adjusting axis of the width adjusting member is rotated in the left-right direction, the first adjusting axis and the second adjusting axis interlockingly rotate, the A cam and the B cam of the first adjusting axis slidably contact with the A protrusion and the B protrusion of the first movable member respectively and the A cam and the B cam of the second adjusting axis slidably contact with the A protrusion and the B protrusion of the second movable member respectively to relatively rotate the first movable member and the second movable member.

It is preferable that the rotor has a conical-shaped upper surface and an inverse conical-shaped outer circumferential side surface, the conical-shaped upper surface has a conical shape formed from a plurality of fan-shaped inclined surfaces, and an inclination of one end in a circumferential direction of each of the plurality of fan-shaped inclined surfaces is steeper than an inclination of the other end in the circumferential direction thereof and a height of an outer circumferential edge is formed so as to gradually increase toward a direction opposite to a rotational direction of the rotor.

It is preferable that the rotor has steps which enlarge as approaching to an outside of a radial direction thereof between the adjacent fan-shaped inclined surfaces.

It is preferable that the rotor has a rotor cover placed on a rotor main body, and the plurality of fan-shaped inclined surfaces are formed on an upper surface of the rotor cover.

It is preferable that the rotor cover adheres to the rotor main body with a magnet.

It is preferable that the rotor cover has an inverse conical-shaped outer circumferential surface continuing to an inverse conical-shaped outer circumferential surface of the rotor main body, and the rotor has a plurality of engaging steps formed on a lower end of the outer circumferential surface of the rotor cover at regular intervals in a circumferential direction thereof and the plurality of engaging steps are engaged with steps formed on an upper end of the rotor main body.

It is preferable that a tablet cassette contains the rotor.

In addition, the present invention provides tablet guide means for reliably guiding tablets in a cassette main body into a tablet pocket between a rotor and a cassette main body. Heretofore, there is a problem that when the number of the tablets contained in the cassette main body of the tablet cassette decreases, the tablets keep on rotating on the rotor together with the rotor and do not enter into the tablet pocket between the rotor and the cassette main body and thus the tablets cannot be discharged. The tablet guide means is configured to solve such a problem.

Namely, the present invention provides a rotor which is rotatably contained in a cassette main body for containing tablets and has tablet pockets for receiving the tablets in the cassette main body and a plurality of tablet guide paths for guiding the tablets in the tablet pocket to a tablet discharging hole provided in the cassette main body, wherein the rotor has a conical-shaped upper surface and an inverse conical-shaped outer circumferential side surface, wherein the conical-shaped upper surface has a conical shape formed from a plurality of fan-shaped inclined surfaces, wherein a radius of one end in a circumferential direction of each of the plurality of fan-shaped inclined surfaces is smaller than a radius of the other end in the circumferential direction thereof, an inclination of the one end in the circumferential direction of each of the plurality of fan-shaped inclined surfaces is steeper than an inclination of the other end in the circumferential direction thereof and a height of an outer circumferential edge of each of the plurality of fan-shaped inclined surfaces is formed so as to gradually increase toward a direction opposite to a rotational direction of the rotor.

It is preferable that the rotor has steps which enlarge as approaching to an outside of a radial direction between the adjacent fan-shaped inclined surfaces.

It is preferable that the rotor has a rotor cover placed on a rotor main body, and the plurality of fan-shaped inclined surfaces are formed on an upper surface of the rotor cover.

It is preferable that the rotor cover adheres to the rotor main body with a magnet.

It is preferable that the rotor cover has an inverse conical-shaped outer circumferential surface continuing to an inverse conical-shaped outer circumferential surface of the rotor main body, and the rotor cover has a plurality of engaging steps formed on a lower end of the outer circumferential surface of the rotor cover at regular intervals in a circumferential direction thereof and the plurality of engaging steps are engaged with steps formed on an upper end of the rotor main body.

It is preferable that a tablet cassette contains the rotor.

According to the present invention, it is possible to adjust the depth of the tablet guide path by raising and lowering the rotor depending on the thickness of the tablet with the rotor raising and lowering mechanism. Further, it is possible to adjust the partitioning position of the tablet guide path by raising and lowering the tablet support table depending on the height of the tablet with fixing the portioning member with the tablet support table raising and lowering mechanism. Further, it is possible to adjust the width of the tablet guide path by relatively rotating the first movable member and the second movable member depending on the size of the tablet with the movable member moving mechanism. Since all of these mechanisms are provided at the rotor, it is possible to adjust these mechanisms on the side of the rotor without adjusting the side of the cassette main body. Especially, it is possible to adjust the partitioning position for the tablets with the partitioning member by raising and lowering the tablet support table on the lower side of the partitioning member with fixing and without changing the position of the partitioning member provided at the cassette main body.

Since each of the inclined outer surface, the tablet support table and the first and second vertical protruding pieces constituting each tablet guide path is formed from a single component with respect to all of the tablet guide paths, the number of components is small. Further, since it is possible to adjust the depth, the partitioning position and the width of the tablet guide path depending on the shape and the size of the tablet with the adjusting members exposed from the rotor main body, it is possible to treat various tablets having various shapes and various sizes. Furthermore, since each adjusting member is exposed from the rotor main body, it is possible to automatically adjust the depth, the partitioning position and the width of the tablet guide path so as to be suitable for each tablet with a device having a driving axis automatically driving each adjusting member if a rotational amount for each adjusting member is set depending on the kinds of the tablets having different shapes and sizes in advance.

BRIEF DESCRIPTION OF THE DRAWINGS

The present disclosure is described in conjunction with the appended figures.

DETAILED DESCRIPTION OF THE INVENTION

Hereinafter, description will be given to an embodiment of the present invention according to the accompanying drawings.

Figure 1A:
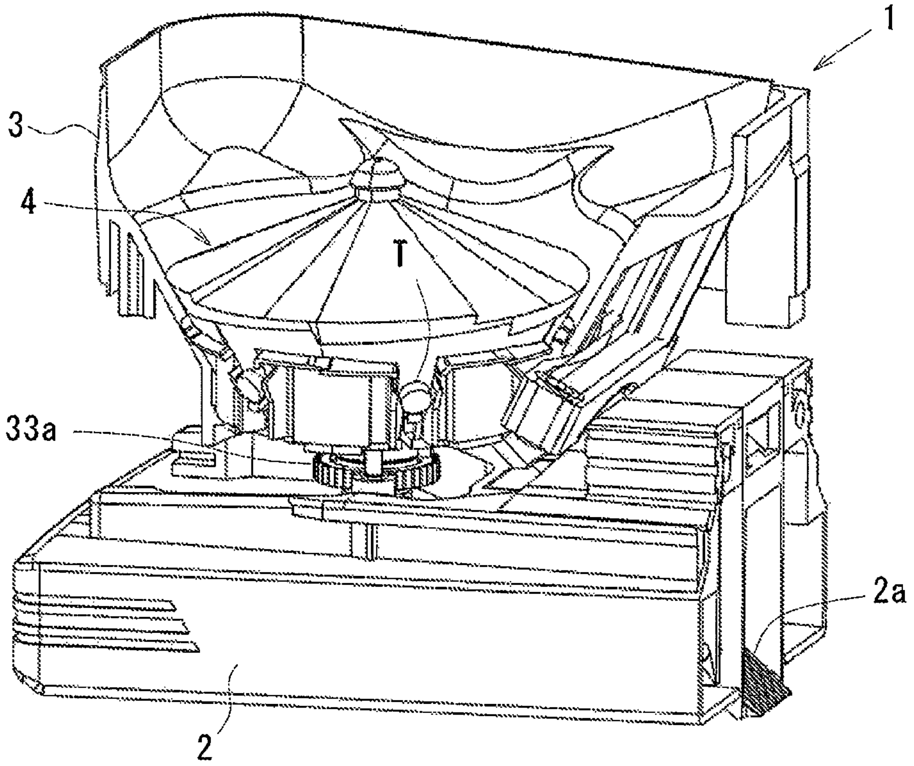
FIG. 1A is a partial cross-sectional perspective view of a tablet cassette including a rotor according to the present invention seen from the side diagonal upper side and FIG. 1B is a partial cross-sectional side view of the tablet cassette.
Figure 1B:
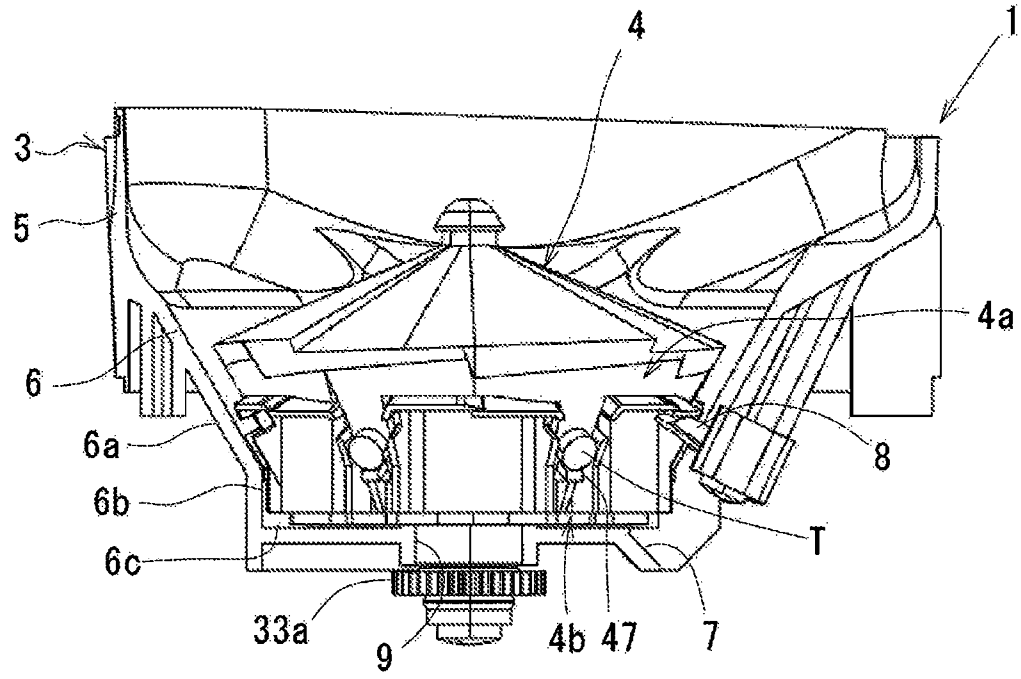

FIGS. 1A and 1B show a tablet cassette 1 to be attached to a tablet containing and dispensing apparatus. The tablet cassette 1 is constituted of a cassette main body 3 provided on a base 2 and a rotor 4 according to the present invention and contained in the cassette main body 3.

The cassette main body 3 is constituted of a tablet containing portion 5 which can contain a plurality of tablets T and a rotor containing portion 6 which is provided on the lower side of this tablet containing portion 5 and contains the rotor 4. An upper end of the tablet containing portion 5 opens and can be opened and closed with a cover not shown in the drawings. The rotor containing portion 6 has an inverse conical-shaped upper portion inclined inner surface 6*a*, a cylindrical lower portion vertical inner surface 6*b* and a bottom surface 6*c*. A tablet discharging hole 7 is formed from a lower portion of the upper portion inclined inner surface 6*a* to the bottom surface 6*c*. The tablet discharging hole 7 is communicated with a tablet discharging path 2*a* formed on the base 2. A partitioning member 8 is attached to an outside of the cassette main body 3 and a tip end of the partitioning member 8 is inserted from an outside to an inside of the rotor containing portion 6. A rotor axis hole 9 is formed in a center of the bottom surface 6*c*.

Figure 2A:
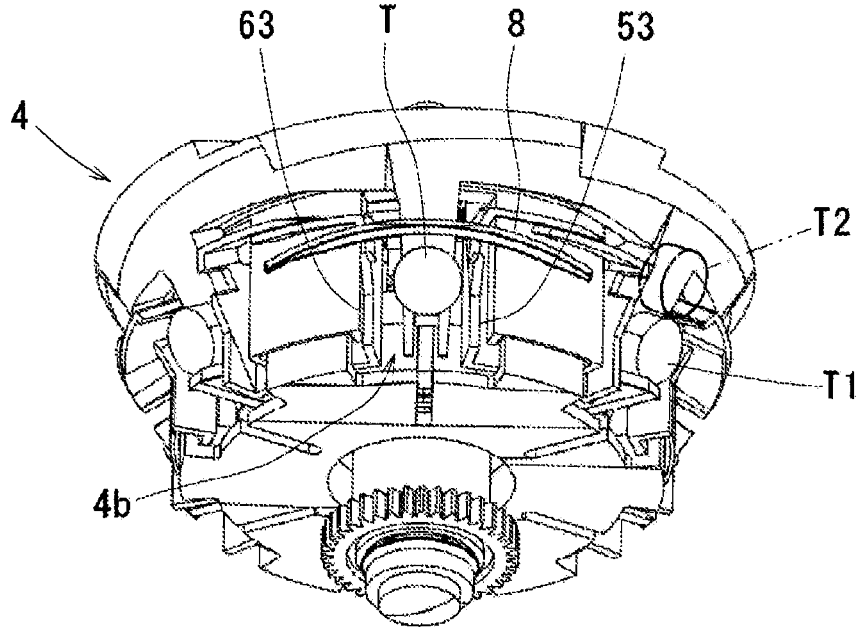
FIG. 2A is an overall perspective view of the rotor seen from the lower side.
Figure 2B:
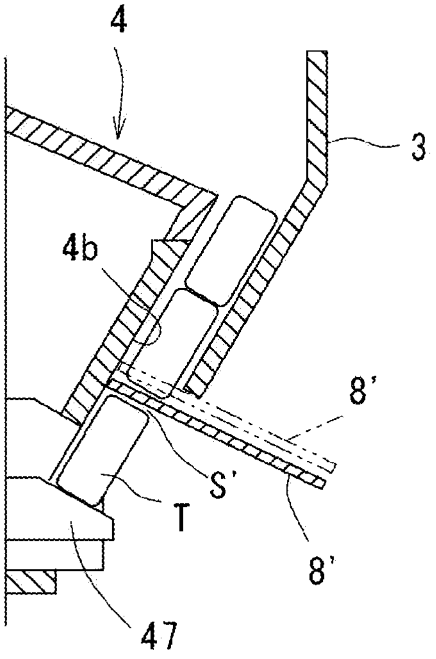
FIG. 2B is a partial cross-sectional view of the tablet cassette having a plate-like partitioning member.
Figure 2C:
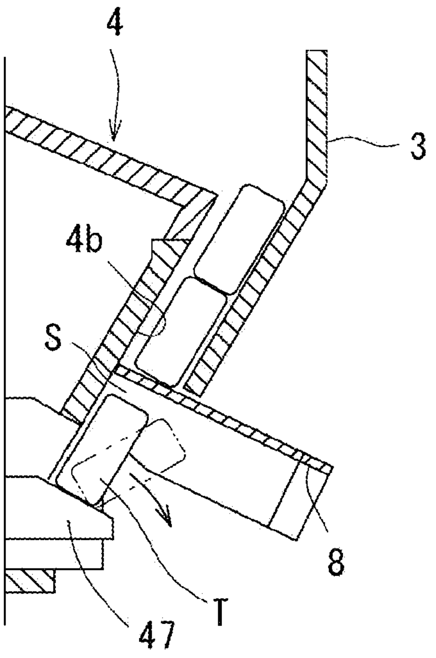
FIG. 2C is a partial cross-sectional view of the tablet cassette having an arc-shaped partitioning member.

As shown in FIG. 2A, the partitioning member 8 is formed into an arc-shape having a convex upper surface. As shown in FIG. 2B, in a case where a partitioning member 8' is formed into not the arc-shape but a plate shape and a clearance S' between the partitioning member 8' and a lowest tablet T in a tablet guide path 4*b* is narrow, there is a case where the tablet T gets stuck with the partitioning member 8' and does not drop down. In this case, if the partitioning member 8' is positioned higher as shown by a two-dot chain line in order to enable the drop of the tablet T, it is impossible to smoothly partition the lowest tablet from a tablet which is second-lowest from the lower side in the tablet guide path 4*b* since the partitioning member 8' contacts with the tablet which is second-lowest from the lower side. In this embodiment, since the partitioning member 8 is formed into the arc-shape protruding toward the upper side, a center portion of the partitioning member 8 is positioned higher as shown in FIG. 2C and a clearance S between the partitioning member 8 and the lowest tablet T in the tablet guide path 4*b* becomes wide. As a result, whereas the lowest tablet T can drop down without getting stuck with the partitioning member 8 as shown in FIG. 2A, both ends of the partitioning member 8 become lower than the center portion of the partitioning member 8. Thus, it is possible to sufficiently provide two functions of dropping the lowest tablet T without getting stuck with the partitioning member 8 and smoothly partitioning the lowest tablet T1 from the tablet T2 which is second-lowest from the lower side.

Figure 2D:
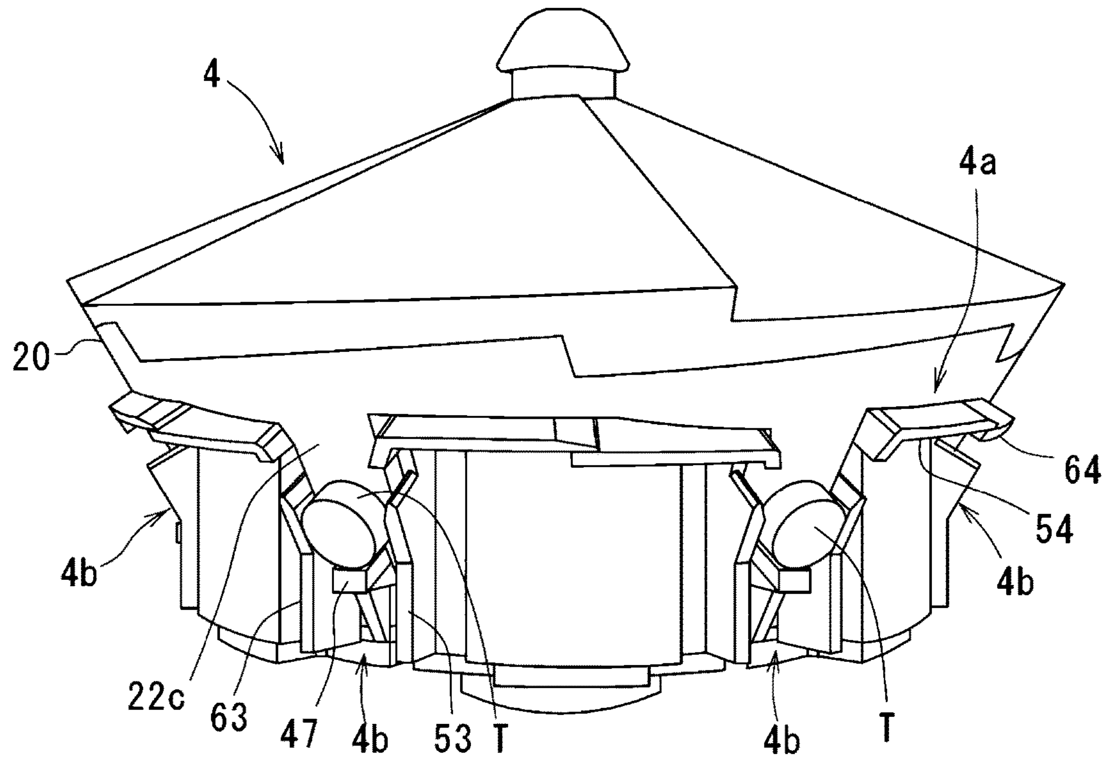
FIG. 2D is an overall view of the rotor.

As shown in FIG. 2D, the rotor 4 has a shape whose upper surface has a conical shape, a side surface has an inverse conical-shape and a bottom surface has a planar shape. Tablet pockets 4*a* are provided on an upper side of the side surface of the rotor in a circumferential direction thereof and a plurality of tablet guide paths 4*b* respectively extending from the tablet pockets 4*a* toward the lower side are provided at regular intervals in the circumferential direction.

Each tablet pocket 4*a* is formed from an outer circumferential surface of the rotor main body 20 described later, a first horizontal protruding piece 54 of a first movable member 50 and a second horizontal protruding piece 64 of a second movable member 60 described later. The tablet pocket 4*a* is surrounded by the upper portion inclined inner surface 6*a* of the cassette main body 3 and receives the tablets T in the tablet containing portion 5 of the cassette main body 3 to align the tablets T in the circumferential direction thereof.

Each of the tablet guide paths 4*b* is formed from a lower portion inclined outer surface 22*c* of a downwardly protruding portion 22 of the rotor main body 20 described later, a first vertical protruding piece 53 of the first movable member 50 described later, a second vertical protruding piece 63 of the second movable member 60 described later and a tablet support table 47 of an annular raising and lowering member 45 described later. Further, each of the tablet guide paths 4*b* is covered by the upper portion inclined inner surface 6*a* of the cassette main body 3 and receives the tablets T aligned in the tablet pocket 4*a* to guide the tablets T toward the lower side.

Figure 3:
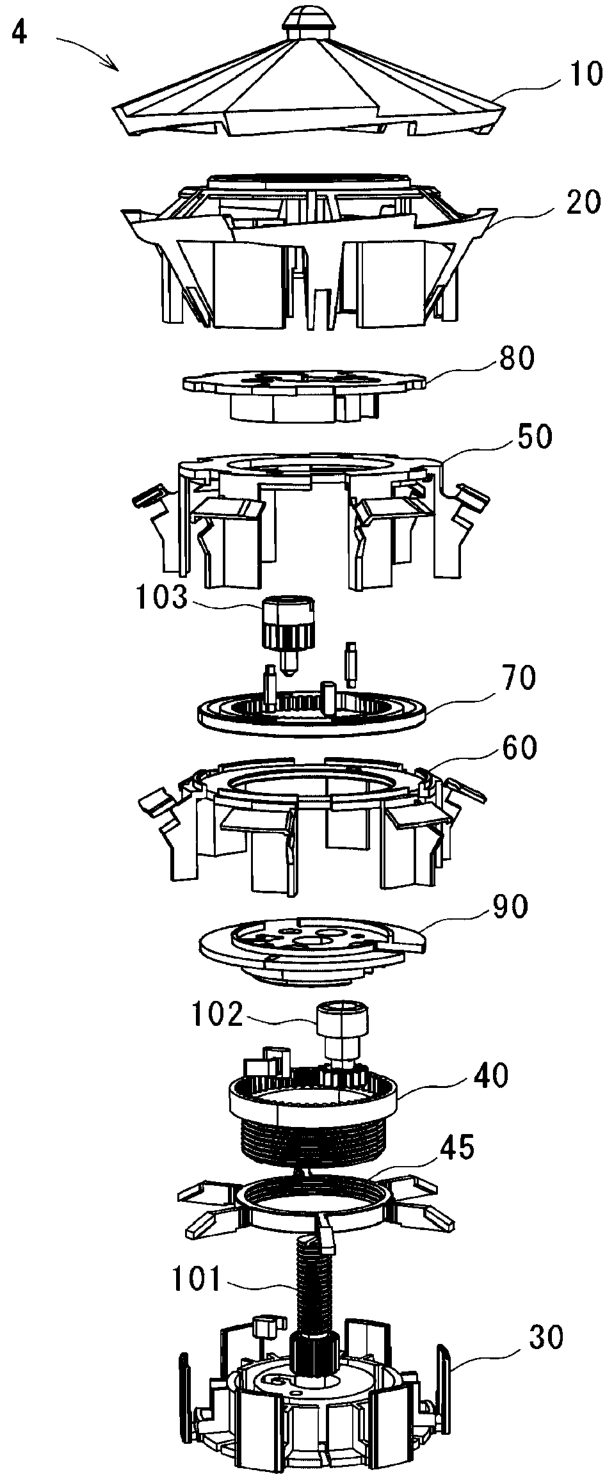
FIG. 3 is an exploded perspective view of the rotor shown in FIG. 2B.

FIG. 3 shows the rotor 4 in a disassembled state. The rotor 4 mainly has a rotor cover 10, the rotor main body 20, a rotor base 30, a cylindrical rotating member 40, the annular raising and lowering member 45, the first movable member 50, the second movable member 60, a cam member 70, a first support member 80, a second support member 90, a thickness adjusting screw 101, a height adjusting screw 102 and a width adjusting screw 103. A rotor raising and lowering mechanism, a tablet support table raising and lowering mechanism and a movable member moving mechanism described later are constituted of these components.

<Rotor Raising and Lowering Mechanism>

Figure 4:
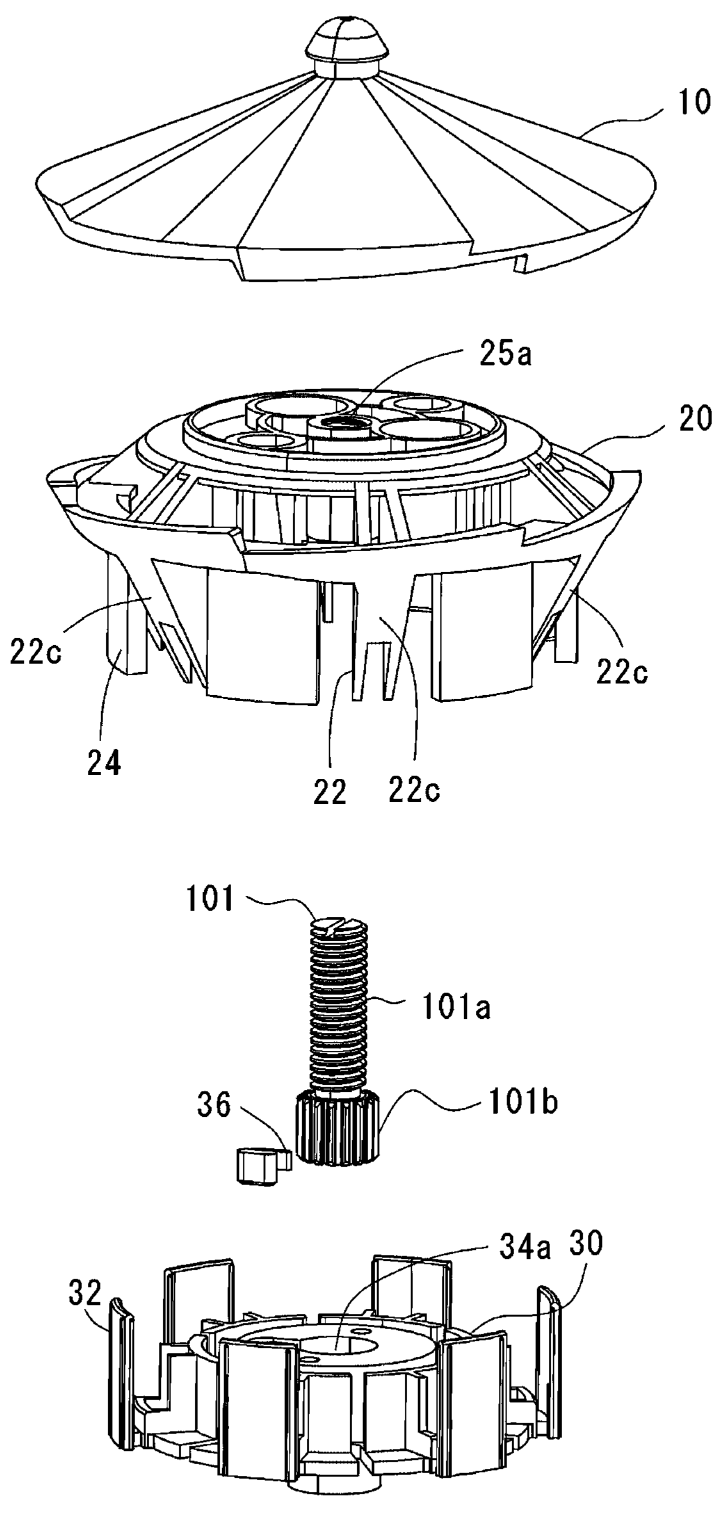
FIG. 4 is an exploded perspective view of a rotor raising and lowering mechanism.

FIG. 4 shows the members constituting the rotor raising and lowering mechanism. The rotor raising and lowering mechanism is constituted of the rotor cover 10, the rotor main body 20, the rotor base 30 and the width adjusting screw 101.

Figure 5A:
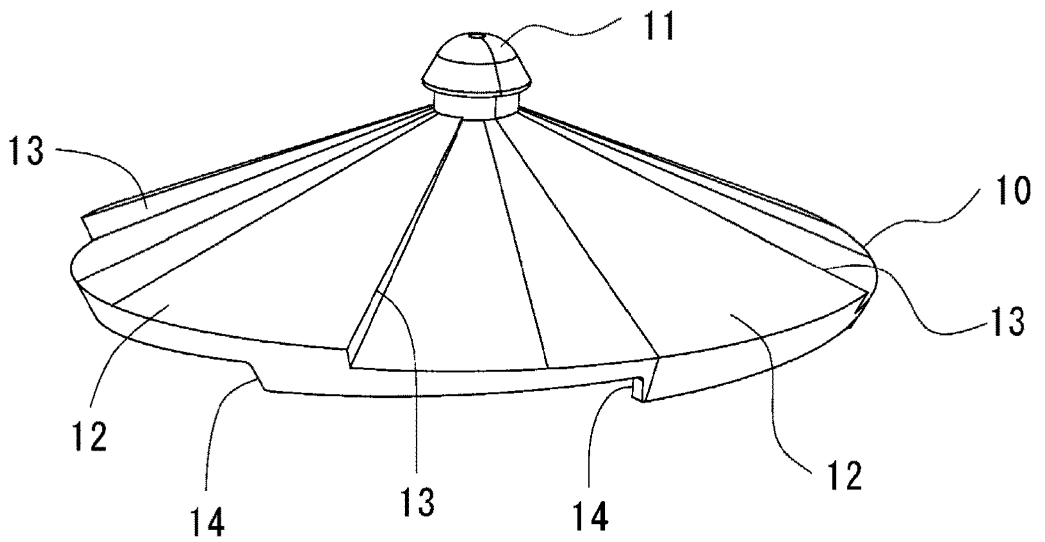
FIG. 5A is a perspective view of a rotor cover seen from the diagonal upper side and FIG. 5B is a perspective view of the rotor cover seen from the diagonal lower side.
Figure 5B:
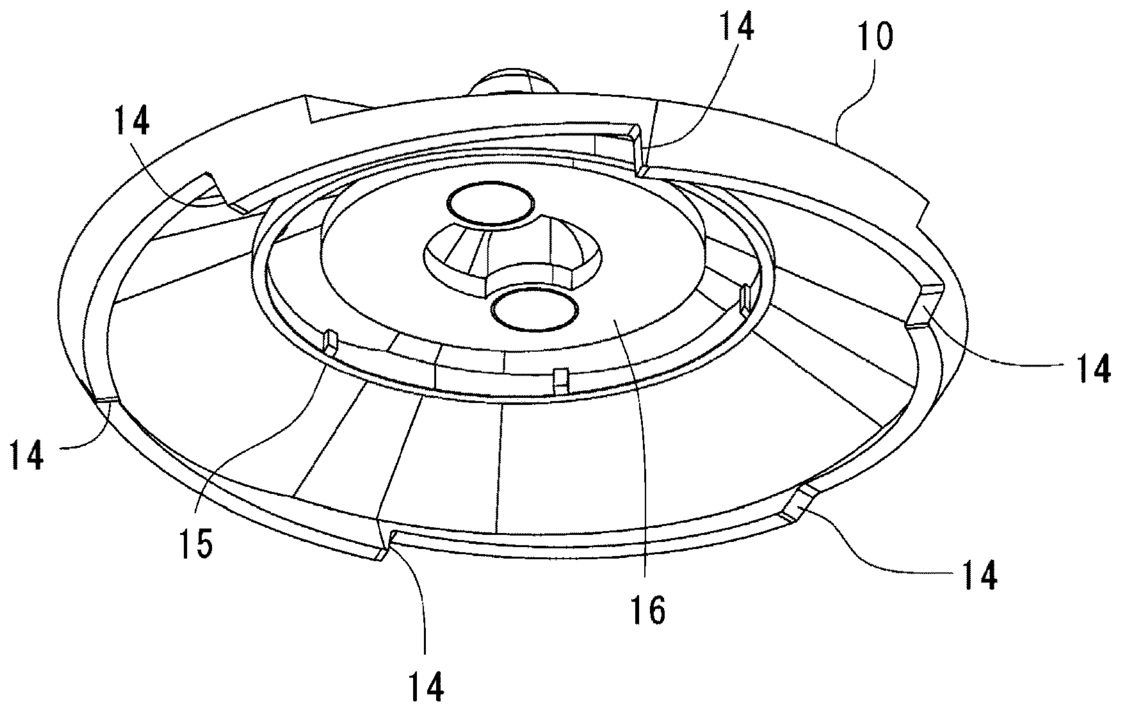
Figure 6A:
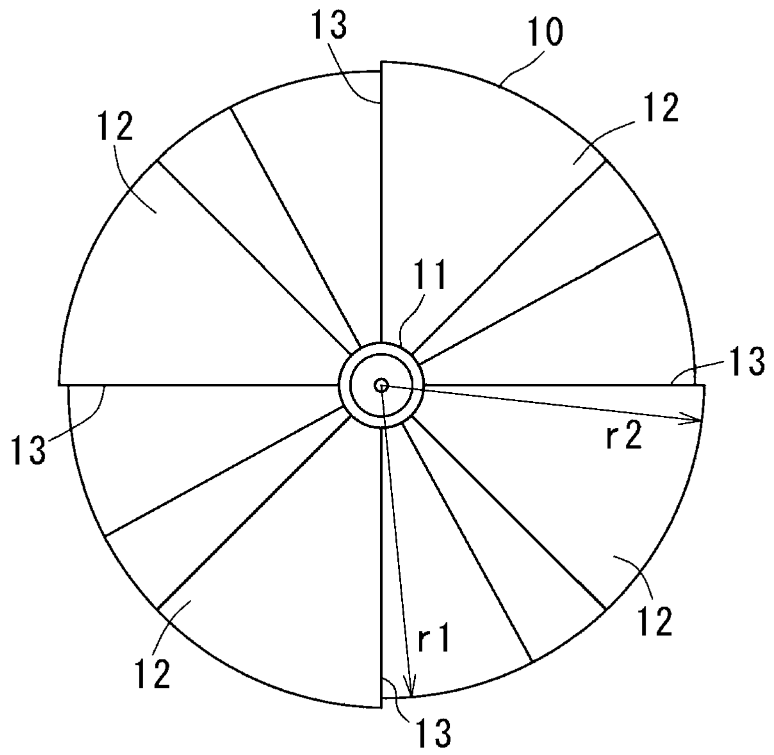
FIG. 6A is a planar view of the rotor cover.
Figure 6B:
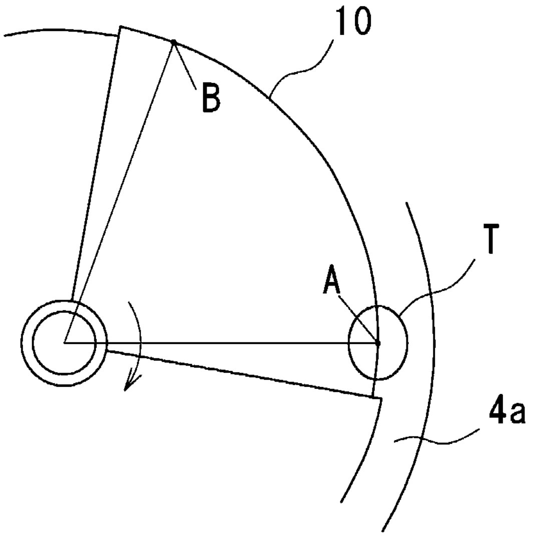
FIGS. 6B and 6C are planar views showing situations that the tablet moves on the rotor cover.
Figure 6C:
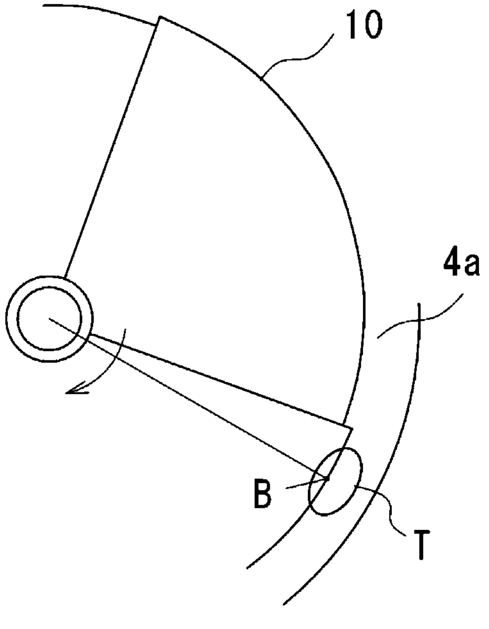
Figure 6D:
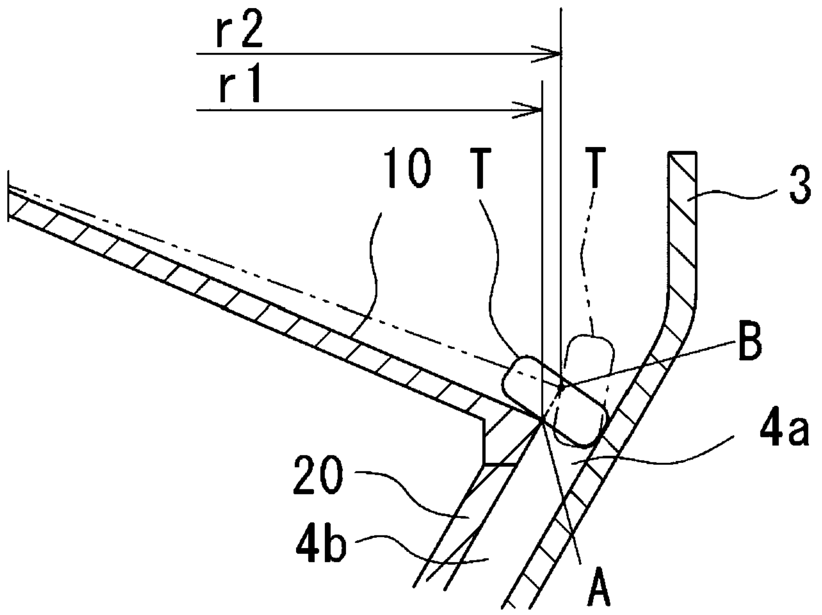
FIGS. 6D and 6E represent respectively a cross-sectional view showing the situation that the tablet moves on the rotor cover in two alternative embodiments.

As shown in FIGS. 5A and 5B, the rotor cover 10 has an umbrella shape as a whole. An upper surface of the rotor cover 10 is formed into a conical shape and an outer circumferential surface of the rotor cover 10 is formed into an inverse conical shape. As described later, means intended for reliably guiding the tablets T contained in the cassette main body 3 to each tablet pocket 4*a* is provided at the rotor cover 10. As shown in FIG. 6A, the upper surface of the rotor cover 10 is formed from four fan-shaped inclined surfaces 12 with a knob 11 positioned at a center as a pivot. Each fan-shape inclined surface 12 is formed so that a radius (r1) is small and an inclination is steep on one end of a circumferential direction thereof and a radius (r2) is large and an inclination is gentle on the other end of the circumferential direction thereof. In this regard, by forming the outer circumferential surface into a cylindrical shape, it is possible to make the radius (r1) of the one end of the circumferential direction of the fan-shaped inclined surface 12 and the radius (r2) of the other end of the circumferential direction of the fan-shaped inclined surface 12 equal to each other. Further, a height of an outer circumferential edge of the rotor cover 10 is formed so as to be gradually increased toward a direction (a counterclockwise direction in FIG. 6A) opposite to a rotational direction of the rotor 4 (a clockwise direction in FIG. 6A). Here, consideration is made to a situation that the rotor 4 rotates in the clockwise direction and the tablet T positioned at a point A of the radius r1 in the vicinity of the outer periphery of the rotor cover 10 reaches a point B of the radius r2 as shown in FIGS. 6B and 6C. Since the tablet T contacts with the inner surface of the cassette main body 3 and receives resistance from the cassette main body 3, the tablet T moves on the rotor cover 10 with sliding on the rotor cover 10 with lagging behind the rotation of the rotor 4. Due to the rotation of the rotor 4 in the clockwise direction, the tablet T moves so that a contact point between the outer circumferential edge of the rotor cover 10 and the tablet T moves from A to B on the diagonal upper side as shown in FIG. 6D. Namely, as the rotor cover 10 rotates in the clockwise direction, the tablet T is pushed toward the upper side by the outer circumferential edge of the rotor cover 10 and pushed toward the outside. As a result, a direction of the tablet T is changed from a laid state to a stand state as shown by a two-dot chain line and thus the tablet T is reliably introduced into the tablet pocket 4*a* between the rotor 4 and the cassette main body 3. Further, as shown in FIG. 5A, steps 13 each enlarging as approaching to an outside of the radial direction are formed between the adjacent fan-shaped inclined surfaces 12. Due to these steps 13, it is possible to agitate the tablets T contained in the cassette main body 3. Further, due to the large steps 13 on the outer periphery of the rotor cover 10, it is possible to change the direction of the tablet T from the laid state to the stand state as shown in FIG. 6D to introduce the tablet T into the tablet pocket 4*a*. In this regard, although the four fan-shaped inclined surfaces 12 are formed, the number of the fan-shaped inclined surfaces 12 is not limited thereto and two or three fan-shaped inclined surfaces 12 may be formed.

Figure 6E:
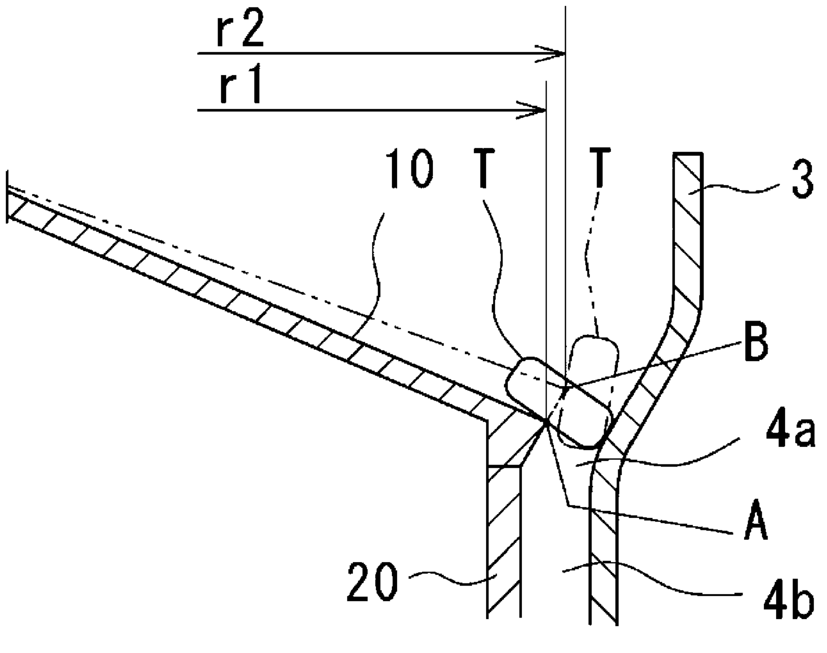

Since it is possible to reliably direct the tablets T contained in the cassette main body 3 into each tablet pocket 4*a* and guide the tablets T to the tablet discharging hole 7 through each tablet guide path 4*b* to discharge the tablets T by using tablet guide means of the rotor cover 10, the tablet guide means of the rotor cover 10 has an effect of smoothly discharging the tablets T by a required amount in a short time from each tablet guide path 4*b* one by one at regular time-intervals. In this regard, the tablet guide means of the rotor cover 10 can be applied to a general rotor having no adjusting means constituted of the rotor raising and lowering mechanism, the tablet support table raising and lowering mechanism and the movable member moving mechanism for the tablet guide path. Further, this tablet guide means can be applied even if the outer surface of the rotor main body 20 is not the inverse conical shape but a cylindrical shape. Namely, as shown in FIG. 6E, even if the outer circumferential surface of the rotor main body 20 on the lower side of the inverse conical-shaped outer circumferential surface of the rotor cover 10 is cylindrical and the tablet guide path 4*b* extends in the vertical direction, it is possible to reliably guide the tablets T into each tablet pocket 4*a* due to the action of the fan-shaped inclined surfaces 12 of the rotor cover 10 as already described above.

As shown in FIG. 5A, a lower end of the outer circumferential surface of the rotor cover 10 is formed into a serrated shape and engaging steps 14 are formed in six locations around the rotor cover 10. As shown in FIG. 5B, an annular rib 15 is formed on an inner surface of the rotor cover 10. A metallic plate 16 formed from a magnetic body adhering to permanent magnets 27 of the rotor main body 20 described later is attached to an inner side of the annular rib 15.

Figure 7A:
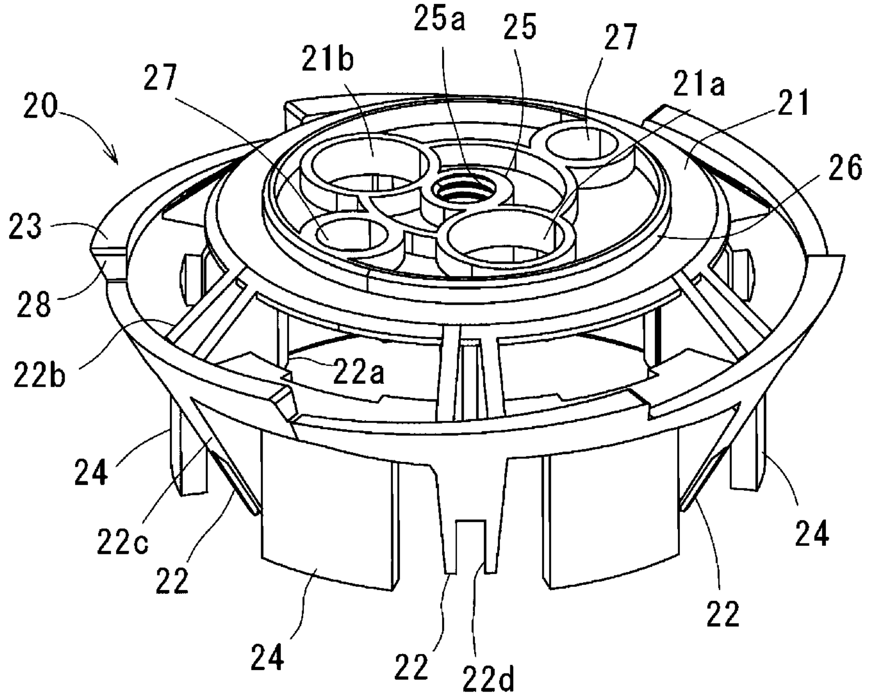
FIG. 7A is a perspective view of a rotor main body seen from the diagonal upper side and FIG. 7B is a perspective view of the rotor main body seen from the diagonal lower side.
Figure 7B:
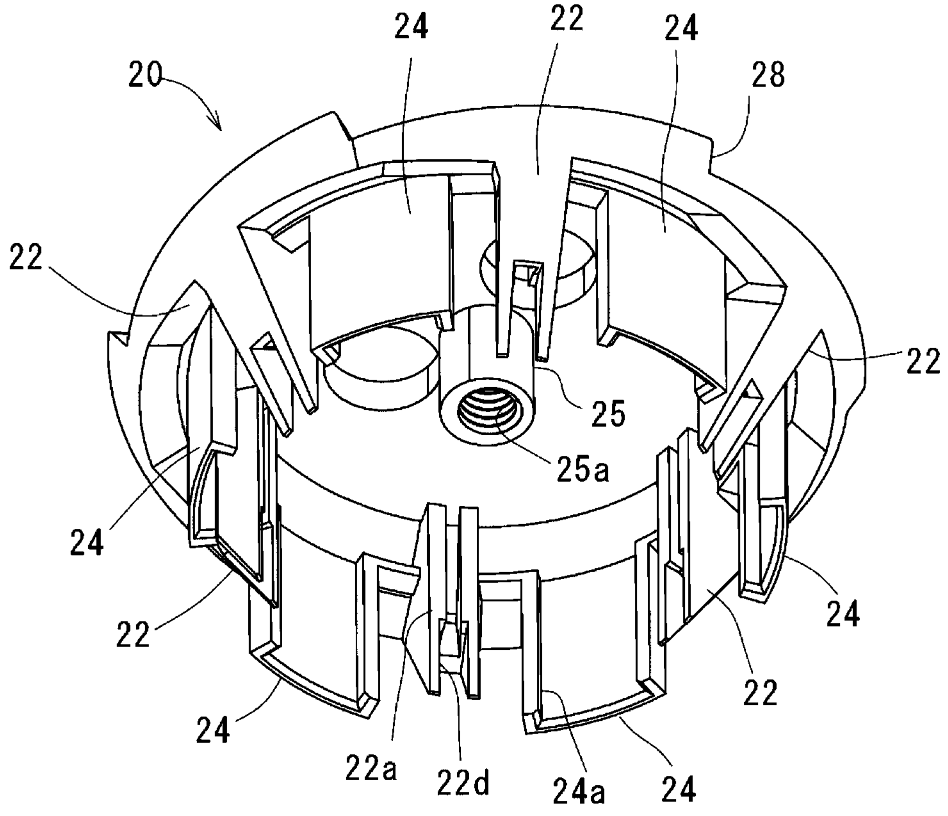

As shown in FIGS. 7A and 7B, the rotor main body 20 has a circular base portion 21, the downwardly protruding portions 22, the annular portion 23 and guide portions 24.

An axis portion 25 protruding from a center of a lower surface of the base portion 21 toward the lower side is provided on the base portion 21 and a screw hole 25*a* is formed in the axis portion 25. On an upper surface of the base portion 21, an annular rib 26 fitted in the inner side of the annular rib 15 of the rotor cover 10 and two holes 21*a*, 21*b* from which the height adjusting screw 102 and the width adjusting screw 103 are respectively exposed are formed. The permanent magnets 27 adhering to the metallic plate 16 of the rotor cover 10 are attached to two locations of the upper surface of the base portion 21.

The downwardly protruding portions 22 respectively extend from six regularly arranged positions of an outer circumferential edge of the base portion 21 toward the lower side. Each downwardly protruding portion 22 is constituted of a vertical inner surface 22*a*, the upper portion inclined outer surface 22*b* inclined from the outer circumferential edge of the base portion 21 toward the lower side and the lower portion inclined outer surface 22*c* inclined from a lower end of the upper portion inclined outer surface 22*b* toward the inside and lower side and is formed into a triangular shape in a side view. The lower portion inclined outer surface 22*c* forms a bottom surface of the tablet guide path 4*b*. A slit 22*d* is formed in a lower end of the downwardly protruding portion 22.

The annular portion 23 is formed on the outside of the base portion 21 concentrically with the base portion 21 and connected to the base portion 21 through the downwardly protruding portions 22. An outer surface of the annular portion 23 is formed into an inverse conical shape continuing to the outer circumferential surface of the rotor cover 10. An upper end of the annular portion 23 is formed into a serrated shape and steps 28 respectively engaged with the engaging steps 14 of the rotor cover 10 to position the rotor cover 10 in the circumferential direction are formed.

The guide portions 24 extend from circumferential six regularly arranged positions of an inner circumferential edge of the annular portion 23 and between the downwardly protruding portions 22 toward the lower side. Guide grooves 24*a* with which guide pieces 32 of the rotor base 30 described later are slidably engaged are respectively formed on inner surfaces of the guide portions 24. By respectively engaging the guide pieces 32 and the guide grooves 24*a* with each other, the rotor base 30 and the rotor main body 20 rotate integrally with each other.

Figure 8A:
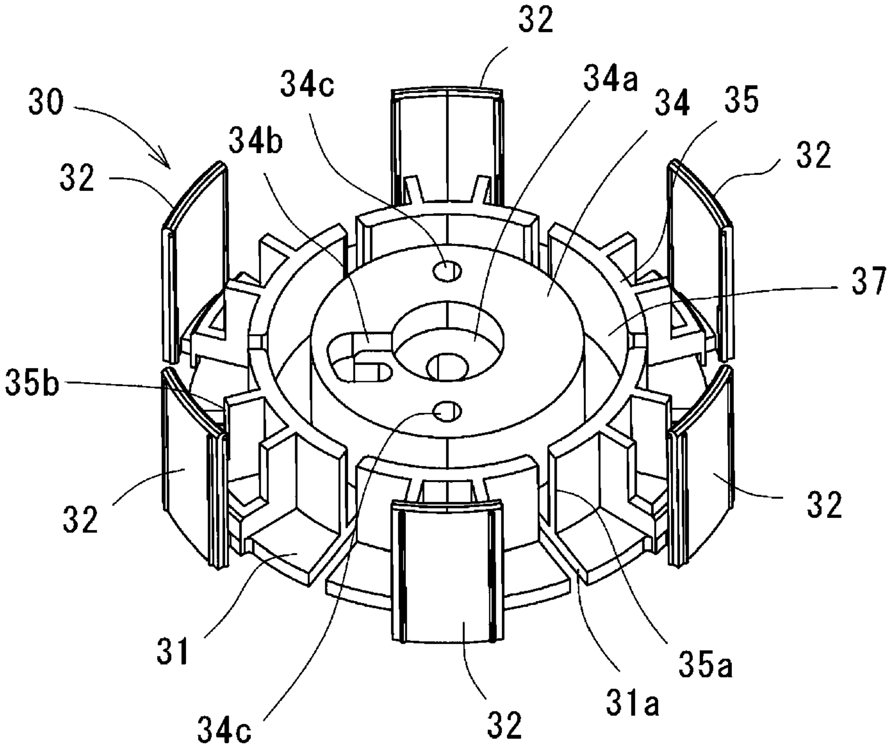
FIG. 8A is a perspective view of a rotor base seen from the diagonal upper side and FIG. 8B is a perspective view of the rotor base seen from the diagonal lower side.
Figure 8B:
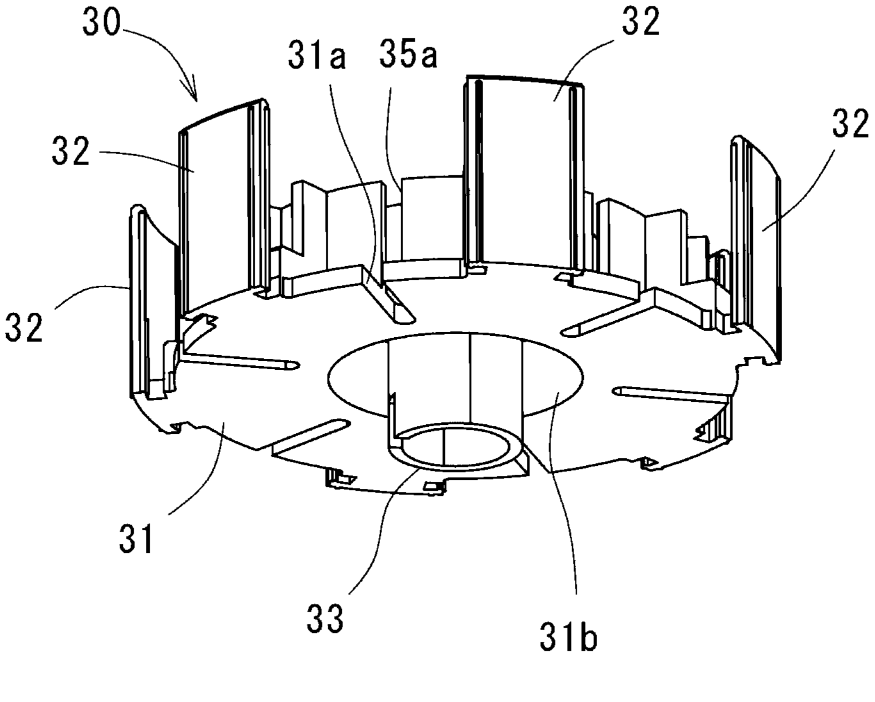

As shown in FIGS. 8A and 8B, the rotor base 30 has a circular base portion 31, the guide pieces 32 and a driving axis 33.

A circular protruding portion 34 is formed on a center of an upper surface of the base portion 31 and an annular wall 35 is formed on the outside of the circular protruding portion 34 on the upper surface of the base portion 31. A concave portion 34*a* for supporting the thickness adjusting screw 101 described later is formed at a center of the circular protruding portion 34. A hole 34*b* for containing a stopper 36 for preventing free rotation of the thickness adjusting screw 101 is formed on the lateral side of the concave portion 34*a*. Further, two screw holes 34*c* with which screws (not shown in the drawings) inserted into two screw insertion holes 100 of the second support member 90 described later are respectively screwed are formed on the lateral side of the concave portion 34*a*. An annular concave portion 37 for containing the tablet support table raising and lowering mechanism described later is formed between the circular protruding portion 34 and the annular wall 35. Vertical slits 35*a* extending in the axial direction are formed at circumferential six regularly arranged positions of the annular wall 35 and these vertical slits 35*a* respectively continue to horizontal slits 31*a* radially formed from the annular concave portion 37 of the base portion 31 to an outer circumferential edge of the base portion 31. A plurality of reinforcing ribs 35*b* are provided at important points of an outer circumferential surface of the annular wall 35. As shown in FIG. 8B, a concave portion 31*b* is formed in a center of a lower surface of the base portion 31.

The guide pieces 32 extend from circumferential six regularly arranged positions of the outer circumferential edge of the base portion 31 and between the adjacent horizontal slits 31*a* toward the upper direction. The guide pieces 32 are formed so as to slidably engage with the guide grooves 24*a* of the guide portions 24 of the rotor main body 20.

The driving axis 33 extends from a bottom center of the concave portion 31*b* on the lower surface of the base portion 31 toward the axial direction. A driving gear 33*a* shown in FIGS. 1A and 1B is attached to this driving axis 33 and the driving gear 33 is configured to rotatably drive due to a motor (not shown in the drawings) provided at the base 2.

As shown in FIG. 4, the thickness adjusting screw 101 has a male screw portion 101*a* and a gear portion 101*b* on a lower end thereof. The male screw portion 101*a* is screwed with the screw hole 25*a* of the rotor main body 20, the gear portion 101*b* on the lower end is contained in and supported by the concave portion 34*a* of the base portion 31 of the rotor base 30 and an upper end of the male screw portion 101*a* protrudes from the screw hole 25*a* of the rotor main body 20 and is exposed to the outside so that the male screw portion 101*a* can be adjusted from the outside by rotating the male screw portion 101*a*. A tip end of the stopper 36 made of an elastic piece is engaged between teeth of the gear portion 101*b*. The gear portion 101*b* on the lower end of the thickness adjusting screw 101 is formed so as to be larger than a hole 96 of the second support member 90 of the movable member moving mechanism described later and thus the thickness adjusting screw 101 cannot be taken out of the second support member 90 toward the upper side.

<Tablet Support Table Raising and Lowering Mechanism>

Figure 10:
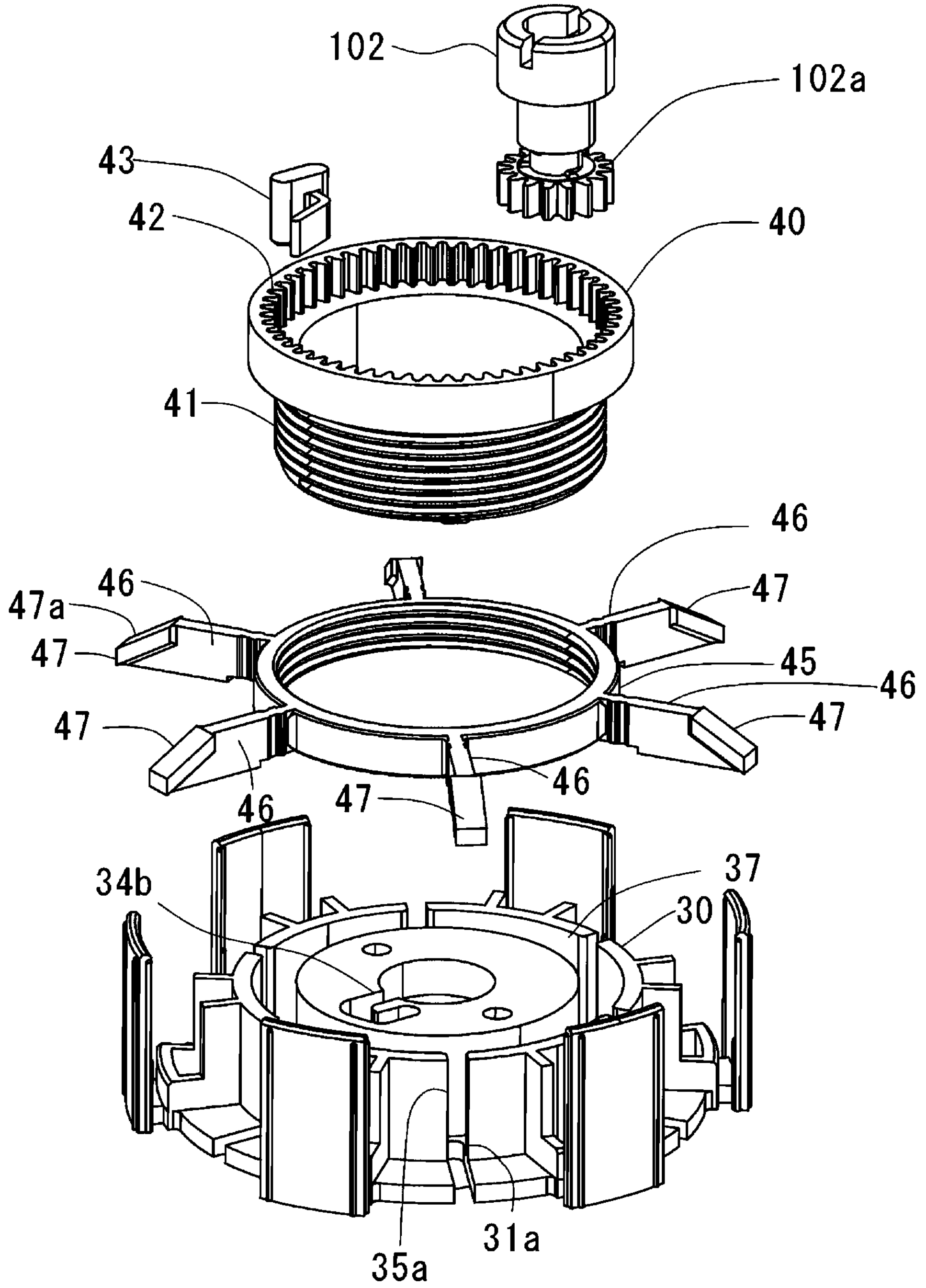
FIG. 10 is an exploded perspective view of a tablet support table raising and lowering mechanism.

FIG. 10 shows the members constituting the tablet support table raising and lowering mechanism. The tablet support table raising and lowering mechanism is constituted of the cylindrical rotating member 40, the annular raising and lowering member 45 and the height adjusting screw 102.

A male screw portion 41 is formed on an outer circumferential lower portion of the cylindrical rotating member 40 and a driven gear 42 is formed on an inner circumferential upper portion of the cylindrical rotating member 40. A stopper 43 for preventing free rotation of the cylindrical rotating member 40 is engaged with the driven gear 42.

Arms 46 are provided at six regularly arranged positions of an outer periphery of the annular raising and lowering member 45 so as to radially protrude and the tablet support tables 47 are respectively formed at tip ends of the arms 46. Each tablet support table 47 has an inclined surface 47*a* perpendicular to the tablet guide path 4*b* so that the tablet support table 47 can support the lowest tablet T in the tablet guide path 4*b*. A female screw portion screwed with the male screw portion 41 of the cylindrical rotating member 40 is formed on an inner surface of the annular raising and lowering member 45.

The height adjusting screw 102 has a driven gear 102*a* meshed with the driving gear 42 of the cylindrical rotating member 40 on a lower end thereof. An upper end of the height adjusting screw 102 protrudes from the hole 21*a* in the upper surface of the base portion 21 of the rotor main body 20 and is exposed to the outside so that the height adjusting screw 102 can be adjusted from the outside by rotating the height adjusting screw 102.

The cylindrical rotating member 40 and the annular raising and lowering member 45 are contained in the annular concave portion 37 of the rotor base 30 in a state that cylindrical rotating member 40 and the annular raising and lowering member 45 are screwed with each other, the arms 46 of the annular raising and lowering member 45 are slidably fitted into the vertical slits 35*a* of the rotor base 30 and the tablet support tables 47 protrude to the outside of the annular wall 35 of the rotor base 30 to support the lowest tablet T in each of the tablet guide paths 4*b*.

<Movable Member Moving Mechanism>

Figure 12:
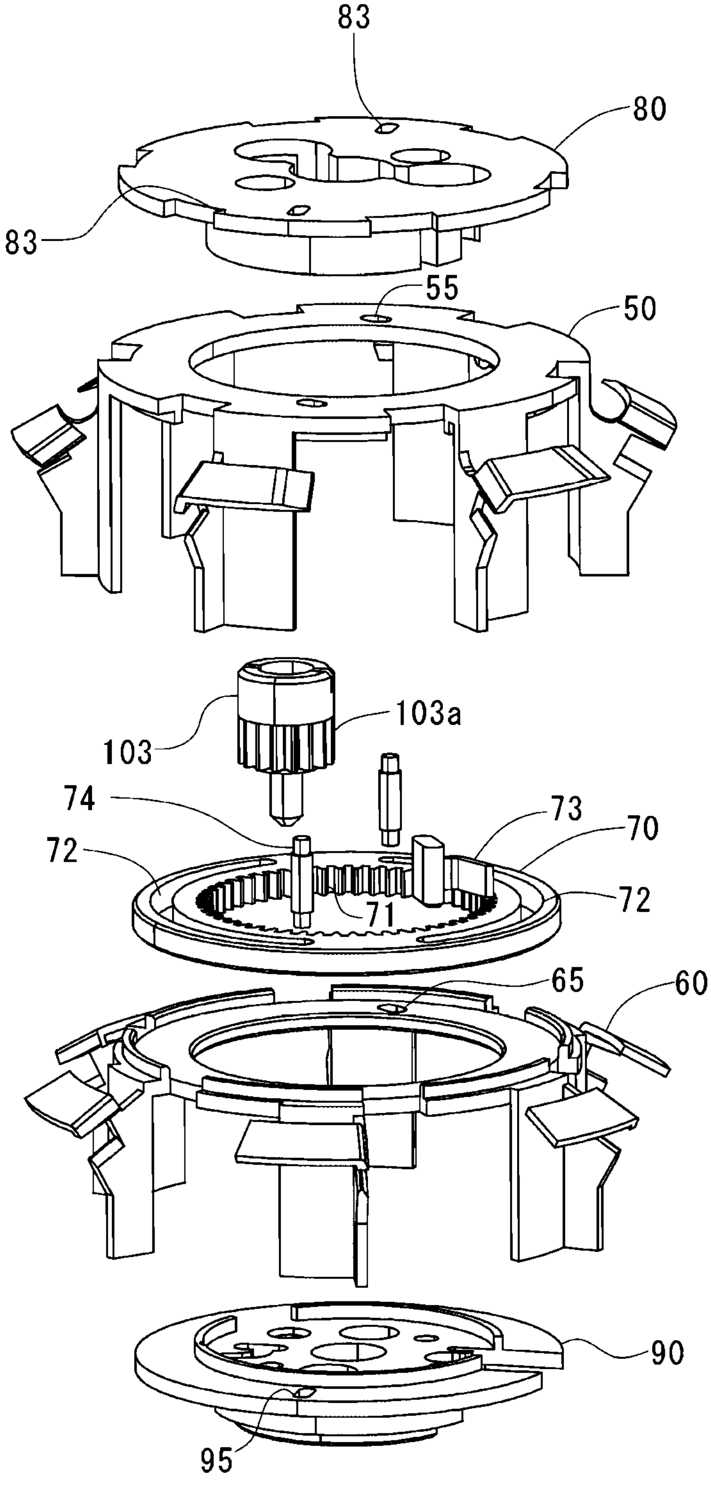
FIG. 12 is an exploded perspective view of a movable member moving mechanism.

FIG. 12 shows the members constituting the movable member moving mechanism. The movable member moving mechanism is constituted of the first movable member 50, the second movable member 60, the cam member 70, the first support member 80, the second support member 90 and the width adjusting screw 103.

Figure 13A:
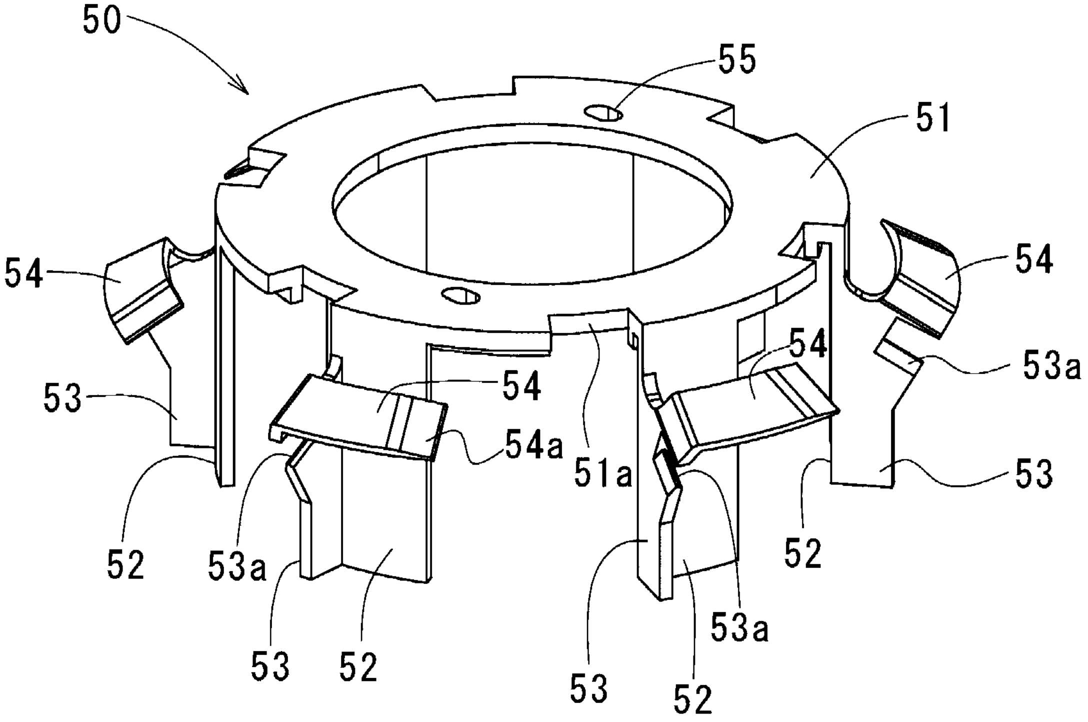
FIG. 13A is a perspective view of a first movable member seen from the diagonal upper side and FIG. 13B is a perspective view of the first movable member seen from the diagonal lower side.
Figure 13B:
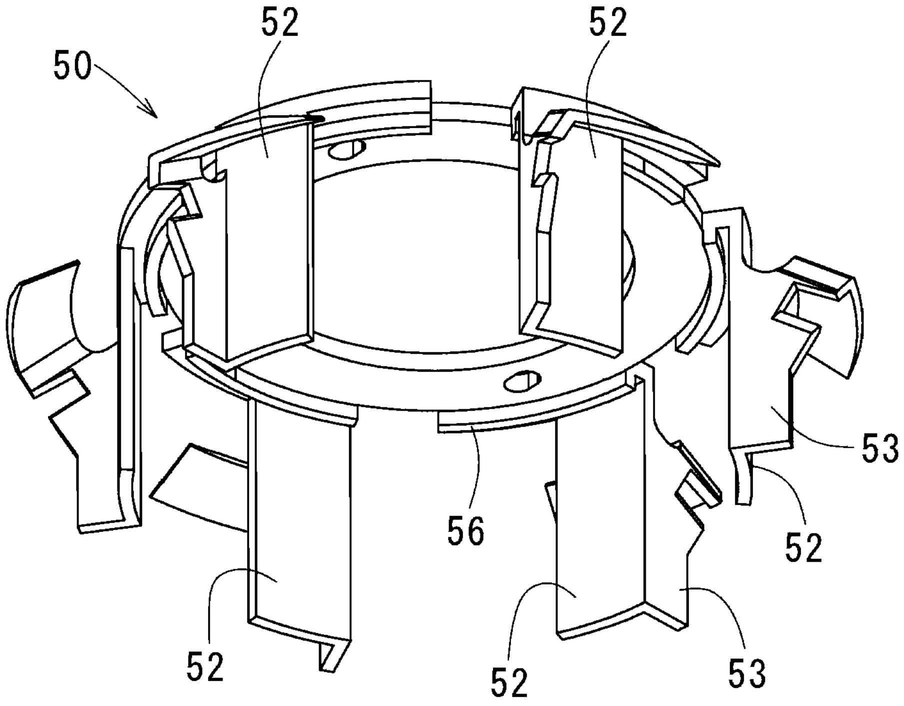
Figure 15A:
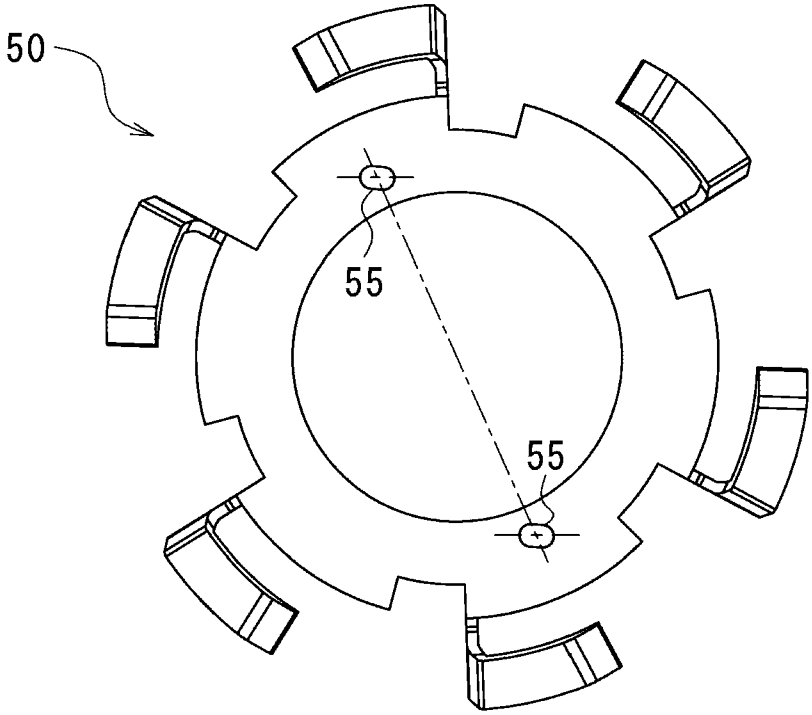
FIGS. 15A and 15B illustrate respectively planar views of the first movable member and the second movable member.

As shown in FIGS. 13A and 13B, the first movable member 50 has an annular base portion 51, six wall portions 52, the first vertical protruding pieces 53 and the first horizontal protruding pieces 54. Two first adjusting holes 55 are respectively formed at positions away from each other by 180 degrees on the base portion 51. As shown in FIG. 15A, each of the first adjusting holes 55 is an elongated hole and its center line is inclined by 60 degrees with respect to a line through a center of the first movable member 50 in a radial direction of the first movable member 50. Referring back to FIGS. 13A and 13B, cutouts 51*a* with which the downwardly protruding portions 22 of the rotor main body 20 are respectively engaged are formed at circumferential six regularly arranged positions of an outer circumferential edge of the base portion 51. Arched guide portions 56 are arranged in an annular shape on a lower surface of the base portion 51. The six wall portions 52 protrude toward the lower side from circumferential six regularly arranged positions of the outer circumferential edge of the base portion 51 and biased to the side of the left-side cutout 51*a* seen from the front side. The first vertical protruding portion 53 protrudes from a left-side end of the wall portion 52 seen from the front side of the wall portion 52 toward the outside to form a right-side surface of the above-described tablet guide path 4*b*. A cutout 53*a* into which the partitioning member 8 is fitted is formed in each of the first vertical protruding pieces 53. The first horizontal protruding piece 54 horizontally extends from an upper end of the first vertical piece 53 toward the right side seen from the front side in the circumferential direction of the first vertical piece 53 to form a bottom surface of the above-described tablet pocket 4*a*. Tapers 54*a* declining toward a tip end thereof are respectively formed on upper surfaces of tip end portions of the first horizontal protruding pieces 54.

Figure 14A:
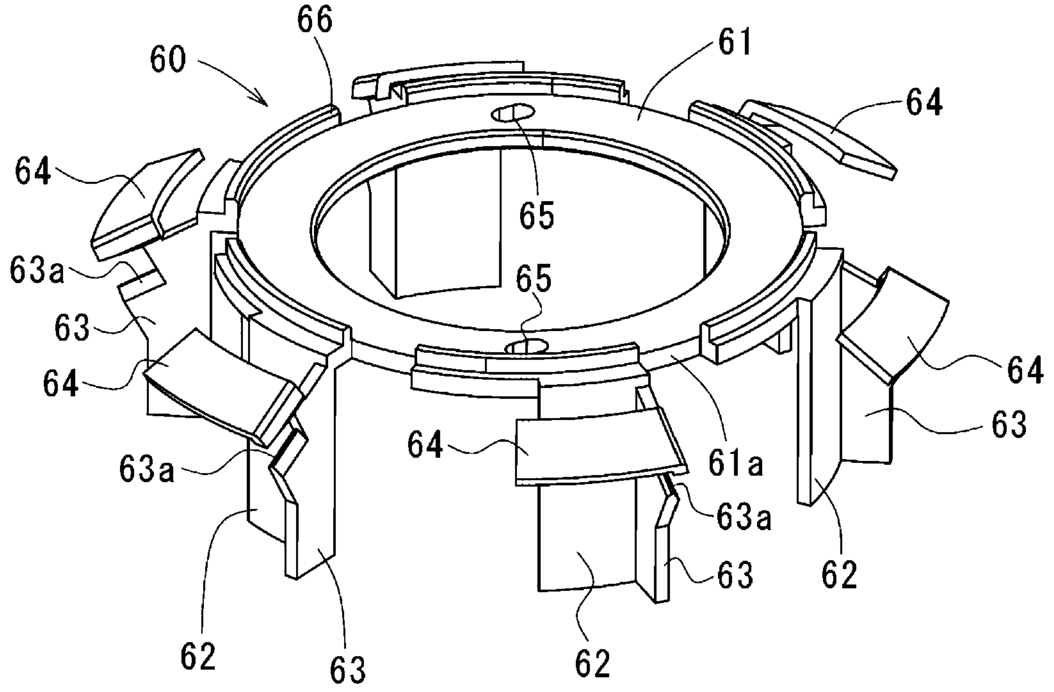
FIG. 14A is a perspective view of a second movable member seen from the diagonal upper side and FIG. 14B is a perspective view of the second movable member seen from the diagonal lower side.
Figure 14B:
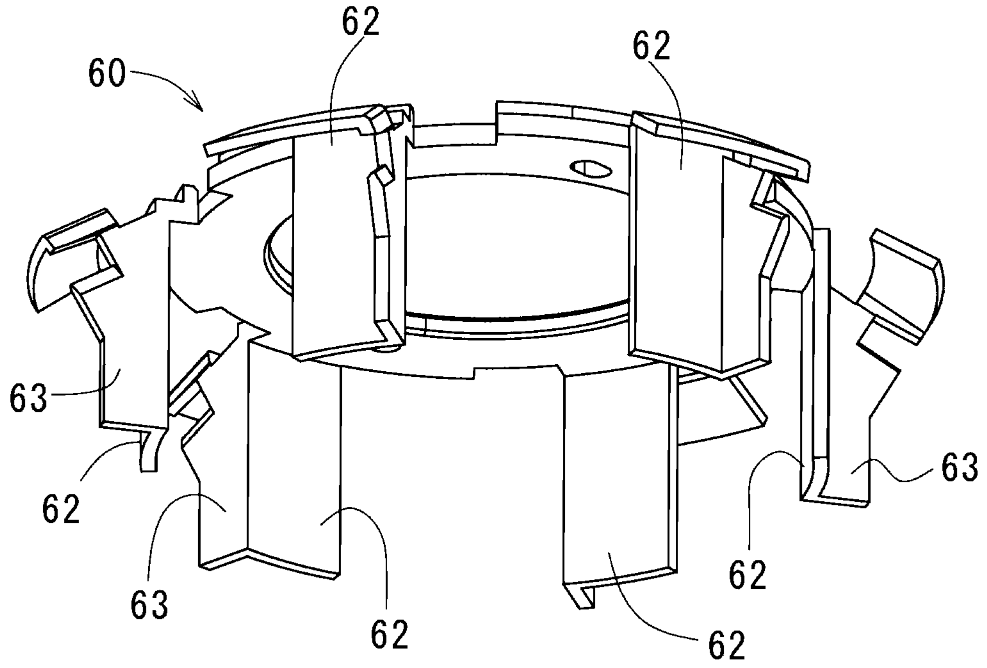
Figure 15B:
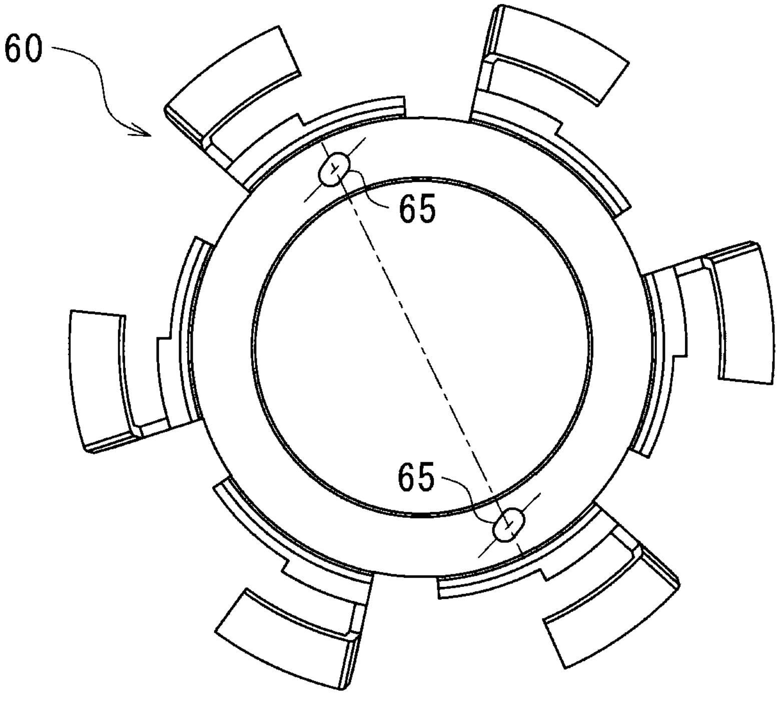

As shown in FIGS. 14A and 14B, the second movable member 60 has an annular base portion 61, six wall portions 62, the second vertical protruding pieces 63 and the second horizontal protruding pieces 64. Two second adjusting holes 65 are respectively formed at positions away from each other by 180 degrees on the base portion 61. As shown in FIG. 15B, each of the second adjusting holes 65 is an elongated hole and its center line extends in a direction crossing each of the first adjusting holes 55 of the first movable member 50 and is inclined by 60 degrees with respect to a line through a center of the second movable member 60 in a radial direction of the second movable member 60. Referring back to FIGS. 14A and 14B, cutouts 61*a* with which the downwardly protruding portions 22 of the rotor main body 20 are respectively engaged are formed at circumferential six regularly arranged positions of an outer circumferential edge of the base portion 61. Arched guide portions 66 are arranged in an annular shape on an upper surface of the base portion 61. The six wall portions 62 downwardly protrude from circumferential six regularly arranged positions of the outer circumferential edge of the base portion 61 and biased to the side of the right-side cutout 61*a* seen from the front side. The second vertical protruding portion 63 protrudes from a right-side end of the wall portion 63 seen from the front side of the wall portion toward the outside to form a left-side surface of the above-described tablet guide path 4*b*. A cutout 63*a* into which the partitioning member 8 is fitted is formed in each of the second vertical protruding pieces 63. The second horizontal protruding piece 64 horizontally extends from an upper end of the second vertical piece 63 toward the left side seen from the front side in the circumferential direction of the second vertical piece 63 to form the bottom surface of the above-described tablet pocket 4*a* together with the first horizontal protruding piece 54 of the first movable member 50. A tip end portion of the second horizontal protruding piece 64 of the second movable member 60 is formed so as to overlap under a tip end portion of the first horizontal protruding piece 54 of the first movable member 50.

Figure 16A:
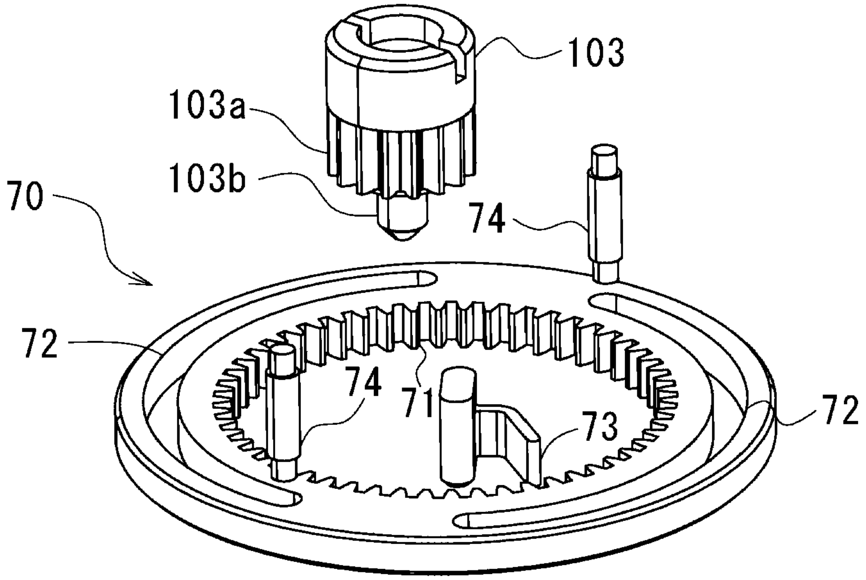
FIGS. 16A and 16B illustrate respectively a perspective view and a planar view of a cam member.
Figure 16B:
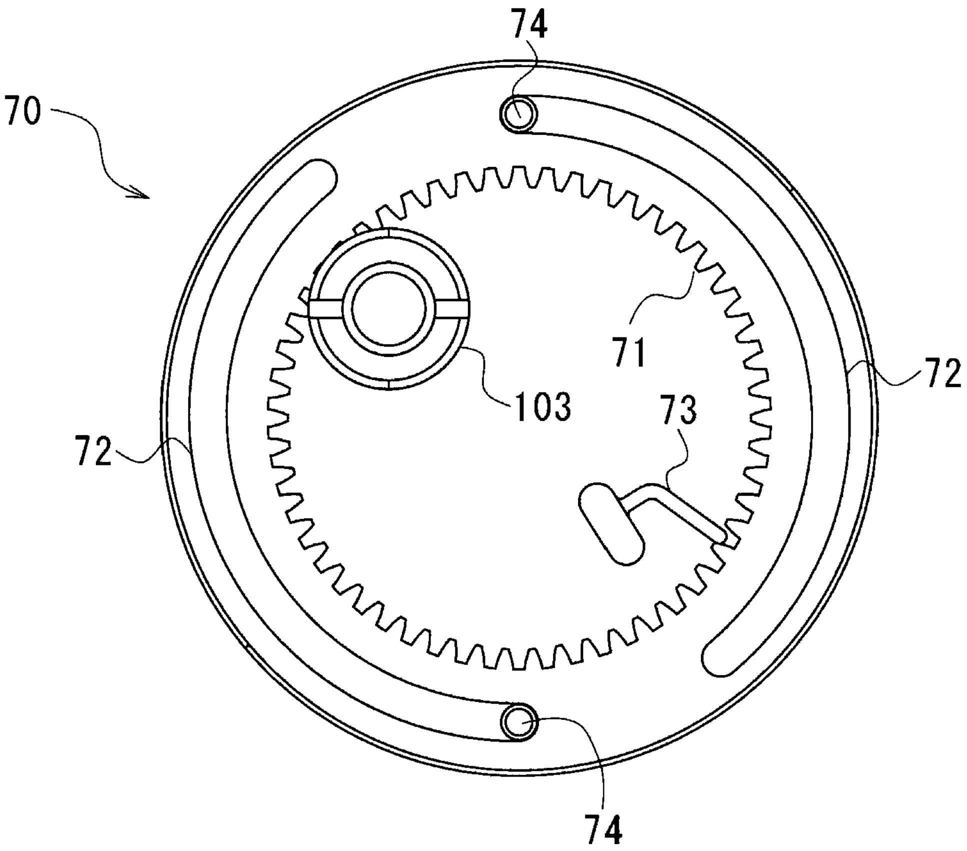

As shown in FIGS. 16A and 16B, the cam member 70 has an annular shape and the cam member 70 is arranged between the first movable member 50 and the second movable member 60 and guided by the guide portions 56 on the lower surface of the first movable member 50 and the guide portions 66 on the upper surface of the second movable member 60 so that the cam member 50 can rotate. A driven gear 71 is formed on an inner periphery of the cam member 70 and two arc-shaped cam grooves 72 are formed between the inner periphery and an outer periphery of the cam member 70. A stopper 73 for preventing free rotation of the cam member 70 is engaged with the driven gear 71. Although an angle from one end to the other end of the cam groove 72 is about 140 degrees, the present invention is not limited thereto. As shown in FIG. 16B, the cam groove 72 is formed so as to approach to an outer circumferential edge of the cam member 70 as it extends in the clockwise direction in the planar view. Driving pins 74 are respectively inserted into the cam grooves 72.

Figure 17A:
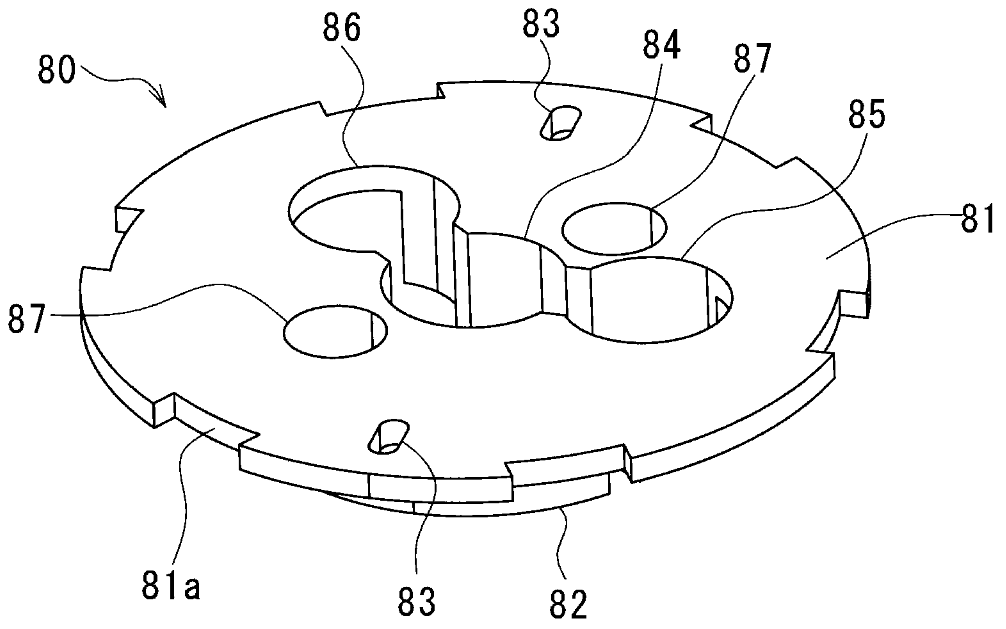
FIG. 17A is a perspective view of a first support member seen from the diagonal upper side and FIG. 17B is a perspective view of the first support member seen from the diagonal lower side.
Figure 17B:
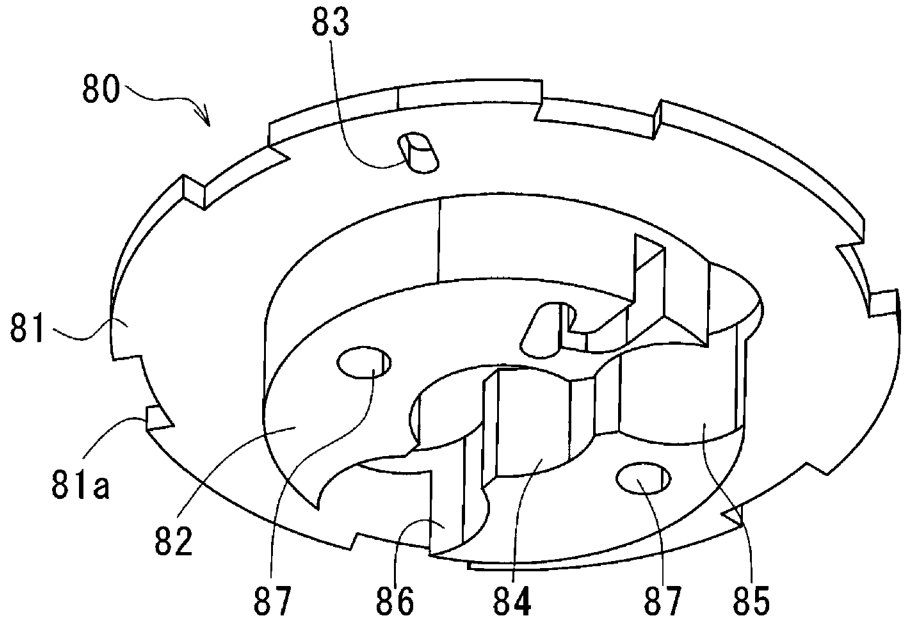

As shown in FIGS. 17A and 17B, the first support member 80 has a circular protruding portion 82 on a lower surface of a circular base portion 81. Two first guide holes 83 are formed at positions away from each other by 180 degrees on the base portion 81. Each of the first guide holes 83 is an elongated hole and extends in a radial direction of the first support member 80 through a center of the first support member 80. An upper end of each of the driving pins 74 is fitted in each of the first guide holes 83. Cutouts 81*a* with which the downwardly protruding portions 22 of the rotor main body 20 are respectively engaged are formed at circumferential six regularly arranged positions of an outer circumferential edge of the base portion 81. A hole 84 through which the thickness adjusting screw 101 of the rotor raising and lowering mechanism passes, a hole 85 through which the height adjusting screw 102 of the tablet support table raising and lowering mechanism passes, a hole 86 through which the width adjusting crew 103 described later passes and two screw insertion holes 87 are formed in a center of the base portion 81.

Figure 18A:
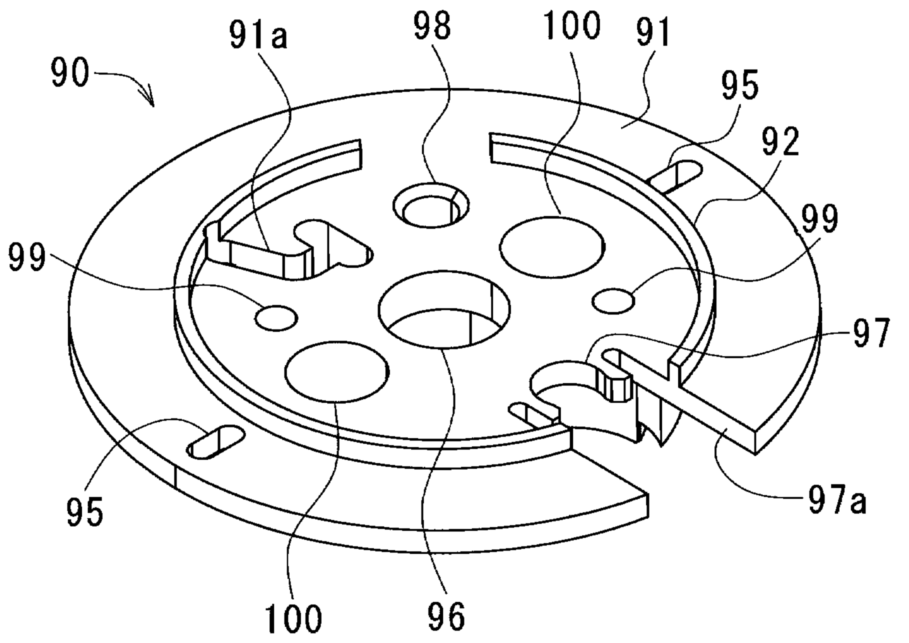
FIG. 18A is a perspective view of a second support member seen from the diagonal upper side and FIG. 18B is a perspective view of the second support member seen from the diagonal lower side.
Figure 18B:
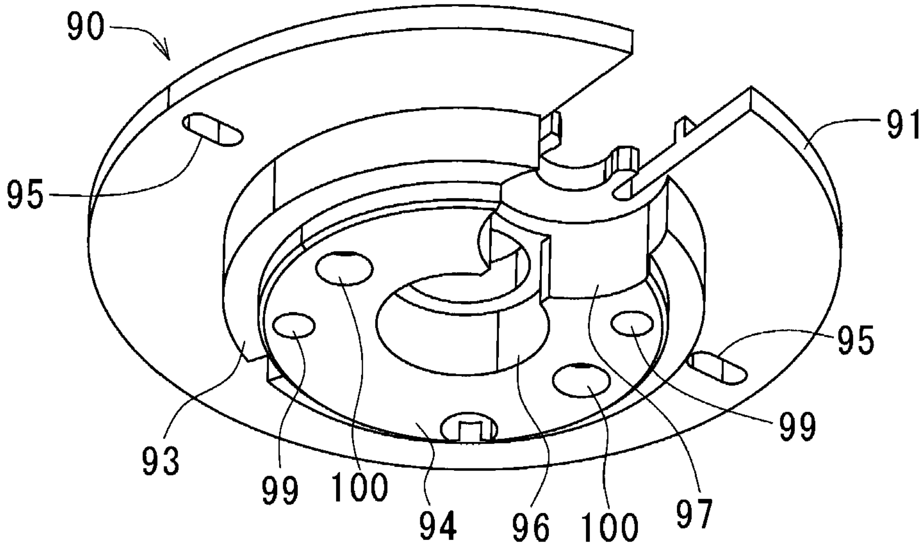

As shown in FIGS. 18A and 18B, the second support member 90 has an annular protruding portion 92 which is formed on an upper surface of a circular base portion 91 and in which the circular protruding portion 82 of the first support member 80 is fitted. The second support member 90 has a circular large protruding portion 93 and a circular small protruding portion 94 on a lower surface of the base portion 91. Each of the large protruding portion 93 and the small protruding portion 94 has a size for allowing each of the large protruding portion 93 and the small protruding portion 94 to fit into the cylindrical rotating member 40 of the above-described tablet support table raising and lowering mechanism. Second guide holes 95 are formed at positions on the outside of the annular protruding portion 92 which are away from each other by 180 degrees and correspond to the first guide holes 83 of the first support member 80. Each of the second guide holes 95 is an elongated hole and extends in a radial direction of the second support member 90 through a center of the second support member 90. A lower end of each of the driving pins 74 is fitted in each of the second guide holes 95. A hole 96 through which the thickness adjusting screw 101 of the rotor raising and lowering mechanism passes, a hole 97 and a cutout 97*a* through which the height adjusting screw 102 of the tablet support table raising and lowering mechanism passes, a hole 98 through which a support axis 103*b* of the height adjusting screw 103 described later passes, two screw holes 99 screwed with screws (not shown in the drawings) inserted into the two screw insertion holes 87 of the first support member 80 and two screw insertion holes 100 are formed at a center of the base portion 91. Further, a through-hole 91*a* in which the stopper 43 of the tablet support table raising and lowering mechanism is fitted is formed in the base portion 91.

By inserting the screws (not shown in the drawings) into the screw holes 99 of the second support member 90 through the screw insertion holes 87 of the first support member 80 and fastening the screws, the first support member 80 and the second support member 90 are integrated in a state that the first support member 80 and the second support member 90 hold the first movable member 50, the second movable member 60 and the cam member 70 therebetween.

Further, by inserting the screws (not shown in the drawings) into the screw holes 34*c* of the rotor base 30 through the screw insertion holes 100 of the second support member 90 and fastening the screws, the second support member 90 is fixed to the rotor base 30 and the cylindrical rotating member 40 of the tablet support table raising and lowering mechanism is held between the second support member 90 and the rotor base 30, thereby restricting the movement in the axial direction.

As shown in FIGS. 16A and 16B, the width adjusting screw 103 has a driving gear 103*a* meshed with the driven gear 71 of the cam member 70 at the middle thereof and the support axis 103*b* is provided on a lower end thereof so as to protrude. An upper end of the width adjusting screw 103 protrudes from the hole 21*b* on the upper surface of the base portion 21 of the rotor main body 20 and is exposed to the outside so that the width adjusting screw 103 can be adjusted from the outside by rotating the width adjusting screw 103.

Next, description will be given to an action of the rotor 4 in the tablet cassette 1 having the above configuration.

As already described with reference to FIG. 2D, the tablet pockets 4*a* extending in the circumferential direction on the upper portion of the side surface of the rotor 4 and the plurality of tablet guide paths 4*b* extending from the upper portion of the side surface of the rotor 4 toward the lower side are included between the cassette main body 3 and the rotor 4.

Each tablet pocket 4*a* is constituted of an outer circumferential side surface formed by the outer circumferential surface of the rotor main body 20 and bottom surfaces arranged at regular intervals in the circumferential direction and formed by the first horizontal protruding piece 54 of the first movable member 50 and the second horizontal protruding piece 64 of the second movable member 60.

Each tablet guide path 4*b* is constituted of the bottom surface formed by the lower portion inclined outer surface 22*c* of the downwardly protruding portion 22 of the rotor main body 20, the right-side surface formed by the first vertical protruding piece 53 of the first movable member 50, the left-side surface formed by the second vertical protruding piece 63 of the second movable member 60 and a lower end surface formed by the tablet support table 47. The tablet guide path 4*b* extends from the adjacent tablet pocket 4*a* toward the bottom surface of the rotor 4.

Referring back to FIG. 1A, the tablets T contained in the tablet containing portion 5 of the cassette main body 3 enter into the tablet pocket 4*a* with being agitated by the steps 13 of the rotor cover 10 due to the rotation of the rotor 4. When the tablets T enter into the tablet guide path 4*b* and the tablet guide path 4*b* approaches to the tablet discharging hole 7, the partitioning member 8 fixed to the cassette main body 3 is inserted between the lowest tablet T and the tablets T above the lowest tablet T in the tablet guide path 4*b*. Due to the partitioning member 8, it is prevented that the tablets T above the partitioning member 8 are dropped down to the lower side. Whereas the lowest tablet T below the partitioning member 8 is placed on the tablet support table 47, the tablet support table 47 is formed to be the inclined surface 47*a*. Thus, the lowest tablet T falls down toward the tablet discharging port 7 on the inclined surface 47*a* and then discharged from the tablet discharging hole 7. The tablet T discharged from the tablet discharging hole 7 is dispensed through the tablet discharging path 2*a* of the base 2. This makes it possible to one by one discharge the tablets T every time when the tablet guide path 4*b* rotates and reaches the tablet discharging hole 7. By adjusting a rotational angle of the rotor 4, it is possible to dispense the tablets by an amount according to a prescription.

The tablet guide path 4*b* can adjust a depth D corresponding to a thickness of the tablet T, a partitioning position H corresponding to a height of the tablet T and a width W corresponding to a width of the tablet T by respectively using the rotor raising and lowering mechanism, the tablet support table raising and lowering mechanism and the movable member moving mechanism described above. Thus, it is possible to appropriately set a size of the tablet guide path 4*b* depending on a shape and a size of the tablet T to be contained in the cassette main body 3. By adjusting the tablet guide path 4*b* so as to correspond to various kinds of the tablet T, it is possible to discharge the various kinds of the tablet T with the same tablet cassette 1 or the rotor 4 and without changing the entire of the tablet cassette 1 or the rotor 4 for every time the kind of the tablet T changes.

<Adjustment for the Depth (the Thickness) of the Tablet Guide Path>

Figure 9A:
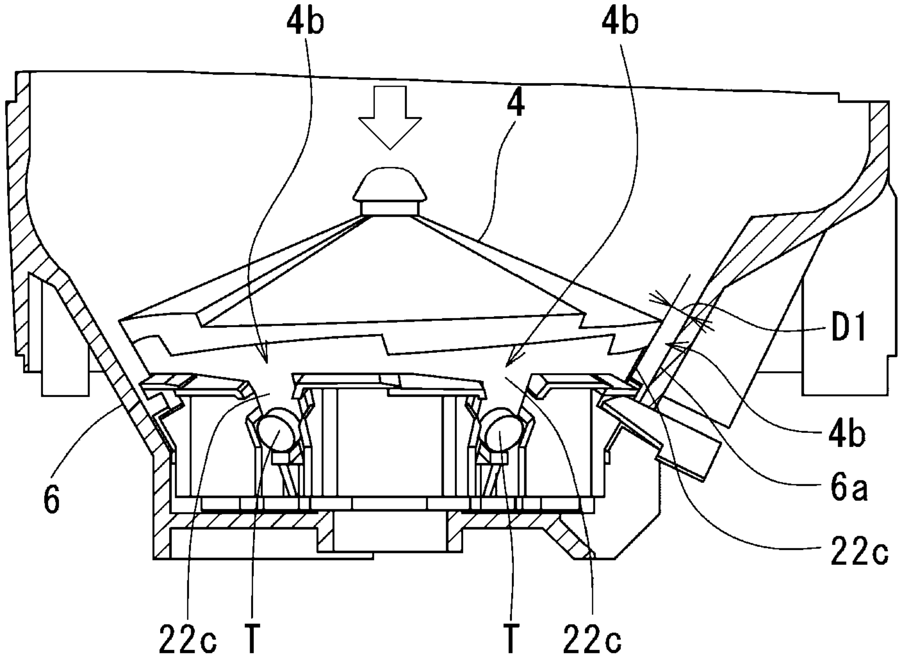
FIG. 9A is a partial cross-sectional side view of the tablet cassette in which the rotor is adjusted for a small tablet and FIG. 9B is a partial cross-sectional side view of the tablet cassette in which the rotor is adjusted for a large tablet.
Figure 9B:
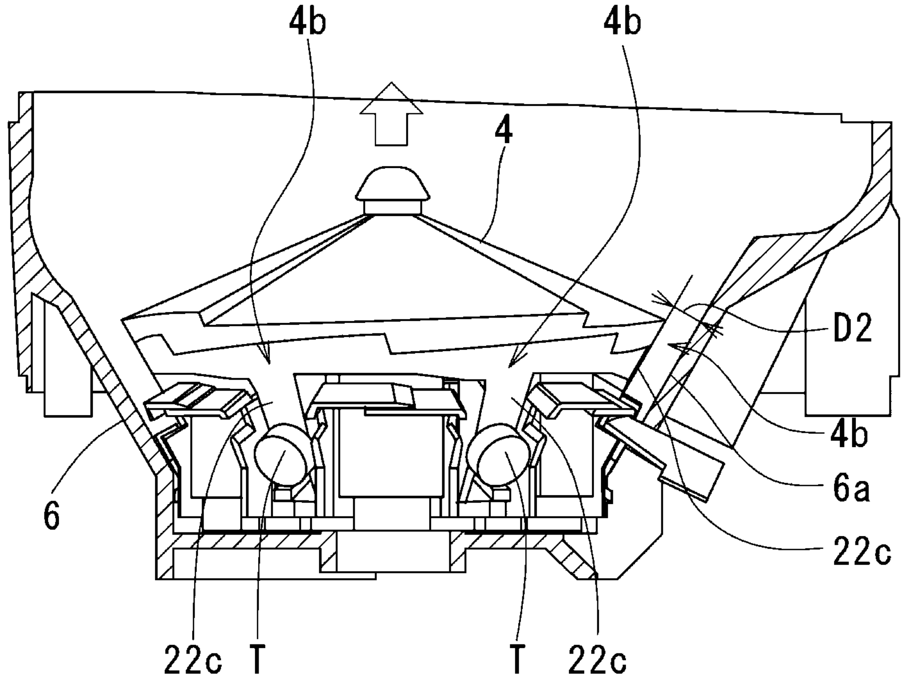

As shown in FIGS. 9A and 9B, in order to adjust the depth D of the tablet guide path 4*b* corresponding to the thickness of the tablet T, the rotor cover 10 adhering to the rotor 4 with magnetic force is removed and the thickness adjusting screw 101 of the rotor raising and lowering mechanism exposed from the upper surface of the rotor main body 20 is rotated in the left or right direction.

Referring back to FIG. 4, regarding the thickness adjusting screw 101, since the movement of the gear portion 101*b* in the axial direction is restricted by the second support member 90 and the rotor base 30 and the rotation of the rotor main body 20 with respect to the rotor base 30 is restricted by the engagements between the guide grooves 24*a* of the rotor main body 20 and the guide pieces 32 of the rotor base 30, the rotor main body 20 having the screw hole 25*a* screwed with the male screw portion 101*a* of the thickness adjusting screw 101 is raised or lowered in the rotational axis direction of the rotor 4 when the thickness adjusting screw 101 is rotated. Along with this movement, the lower portion inclined outer surface 22*c* of the downwardly protruding portion 22 of the rotor main body 20 forming the bottom surface of the tablet guide path 4*b* is also raised or lowered.

With reference to FIGS. 9A and 9B, the lower portion inclined outer surface 22*c* of the downwardly protruding portion 22 inclines in the radial direction from the outer side to the inner side as approaching from the upper side to the lower side and is parallel with the inverse conical-shaped upper portion inclined inner surface 6*a* of the rotor containing portion 6 of the cassette main body 3. Thus, as shown in FIG. 9A, when the lower portion inclined outer surface 22*c* of the downwardly protruding portion 22 of the rotor main body 3 is lowered, a distance between the lower portion inclined outer surface 22*c* of the downwardly protruding portion 22 and the inverse conical-shaped upper portion inclined inner surface 6*a* of the cassette main body 3 decreases and thus it is possible to shallow the depth of the tablet guide path 4*b* to a depth (D1). In contrast, as shown in FIG. 9B, when the lower portion inclined outer surface 22*c* of the downwardly protruding portion 22 of the rotor main body 3 is raised, the distance between the lower portion inclined outer surface 22*c* of the downwardly protruding portion 22 and the inverse conical-shaped upper portion inclined inner surface 6*a* of the cassette main body 3 increases and thus it is possible to deepen the depth of the tablet guide path 4*b* to a depth (D2). As described above, by rotating the thickness adjusting screw 101 in the left or right direction, it is possible to adjust the depth of the tablet guide path 4*b* depending on the thickness of the tablet T passing through the tablet guide path 4*b*. In this regard, since a tip end of the stopper 36 gets over the tooth of the gear portion 101*b* and is engaged between the teeth of the gear portion 101*b* every time when the gear portion 101*b* of the thickness adjusting screw 101 shown in FIG. 4 rotates, it is possible to stop the thickness adjusting screw 101 at an appropriate position and fix the rotor main body 20 at a desired height position.

<Adjustment for the Partitioning Position (Height) of the Tablet Guide Path>

Figure 11A:
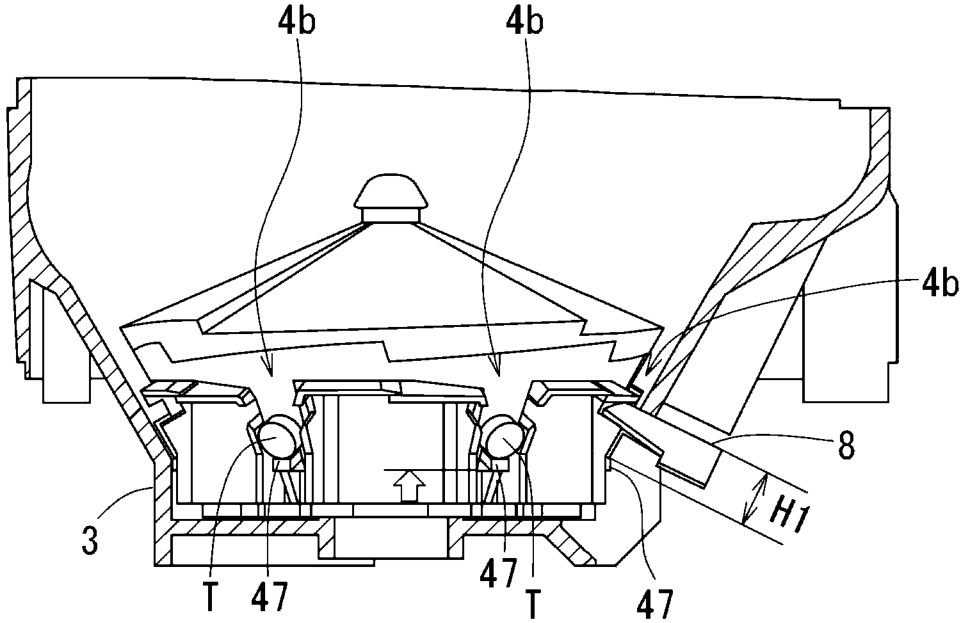
FIG. 11A is a partial cross-sectional side view of the tablet cassette in which the rotor is adjusted for the small tablet and FIG. 11B is a partial cross-sectional side view of the tablet cassette in which the rotor is adjusted for the large tablet.
Figure 11B:
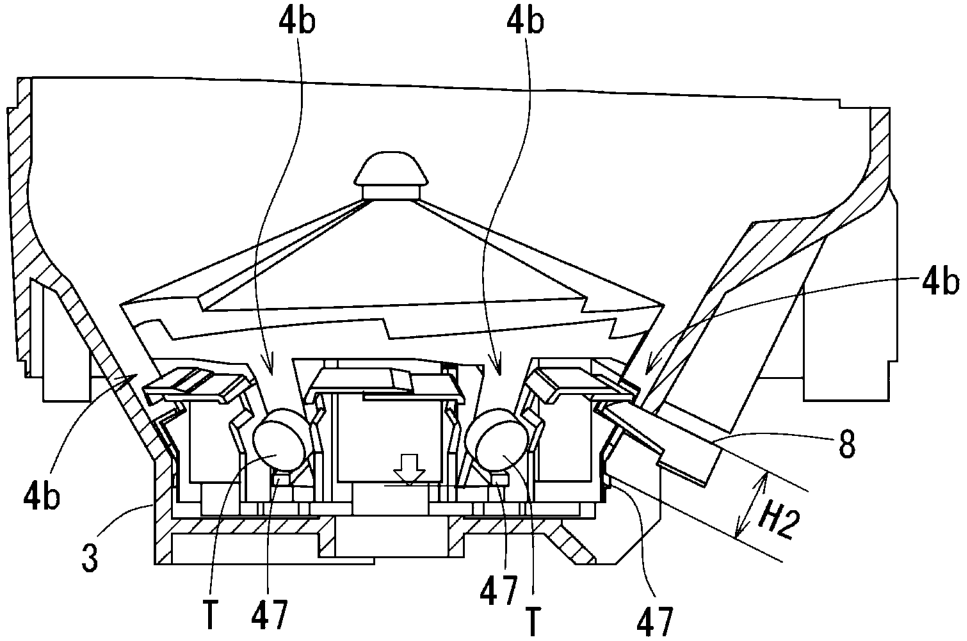

As shown in FIGS. 11A and 11B, in order to adjust the partitioning position H of the tablet guide path 4*b* corresponding to the height of the tablet T, the height adjusting screw 102 of the tablet support table raising and lowering mechanism exposed from the upper surface of the rotor main body 20 is rotated in the left or right direction in FIG. 10. In the present invention, since the partitioning member 8 is fixed to the cassette main body 3, in order to adjust the partitioning position H of the tablet guide path 4*b*, the partitioning member 8 itself is not moved but the tablet support table 47 below the partitioning member 8 is raised and lowered to adjust a distance between the partitioning member 8 and the tablet support table 47, thereby relatively adjusting the partitioning position H for the tablet T.

With reference to FIG. 10, since the driving gear 102*a* of the height adjusting screw 102 meshes with the driven gear 42 of the cylindrical rotating member 40, the cylindrical rotating member 40 rotates when the height adjusting screw 102 is rotated. The movement of the cylindrical rotating member 40 in the vertical direction is restricted by the second support member 90 and the rotor base 30. Since the arms 46 pass through the vertical slits 35*a* of the annular wall 35 of the rotor base 30, the rotation of the annular raising and lowering member 45 having the female screw portion 48 screwed with the male screw portion 41 of the cylindrical rotating member 40 is restricted. Thus, the annular raising and lowering member 45 is raised and lowered by the rotation of the cylindrical rotating member 40 and thus each tablet support table 47 of the annular raising and lowering member 45 is raised and lowered.

Namely, as shown in FIG. 11A, when the t cylindrical rotating member 40 rotates in one direction, the tablet support table 47 of the annular raising and lowering member 45 is raised and thus a position of the partitioning member 8 with respect to the tablet support table 47, that is the partitioning position is lowered to a position (H1). In contrast, as shown in FIG. 11B, when the cylindrical rotating member 40 rotates in the other direction, the tablet support table 47 of the annular raising and lowering member 45 is lowered and thus the position of the partitioning member 8 with respect to the tablet support table 47, that is the partitioning position is raised to a position (H2). In this regard, since a tip end of the stopper 43 gets over the tooth of the driven gear 42 of the cylindrical rotating member 40 and is engaged between the teeth of the driven gear 42 every time when the cylindrical rotating member 40 rotates due to the rotation of the height adjusting screw 102 shown in FIG. 10, it is possible to stop the height adjusting screw 102 at an appropriate position and fix the tablet support table 47 at a desired height position.

<Adjustment for the Width of the Tablet Guide Path>

As shown in FIGS. 19A-19B and FIGS. 20A-20B, in order to adjust the width W of the tablet guide path 4*b* corresponding to the width of the tablet T, the width adjusting screw 103 of the movable member moving mechanism exposed from the upper surface of the rotor main body 20 is rotated in the left or right direction.

Referring back to FIG. 12, since the driving gear 103*a* of the width adjusting screw 103 meshes with the driven gear 71 of the cam member 70, the cam member 70 rotates when the width adjusting screw 103 is rotated. Since the cam grooves 72 of the cam member 70 move due to the rotation of the cam member 70, edges of the cam grooves 72 press the driving pins 74. The driving pins 74 move along the first guide holes 83 of the first support member 80 and the second guide holes 95 of the second support member 90 and press the edges of the first adjusting holes 55 of the first movable member 50 and the edges of the second adjusting holes 65 of the second movable member 60. As a result, the first movable member 50 and the second movable member 60 respectively rotate in directions opposite to each other.

In this regard, although the movable member moving mechanism shown in FIG. 12 rotates the first movable member 50 and the second movable member 60 by providing the first adjusting holes 55 and the second adjusting holes 65 in the first movable member 50 and the second movable member 60, it may be possible to take a configuration in which adjusting holes are provided in one of the first movable member 50 and the second movable member 60 to rotate one of the first movable member 50 and the second movable member 60.

Figure 19A:
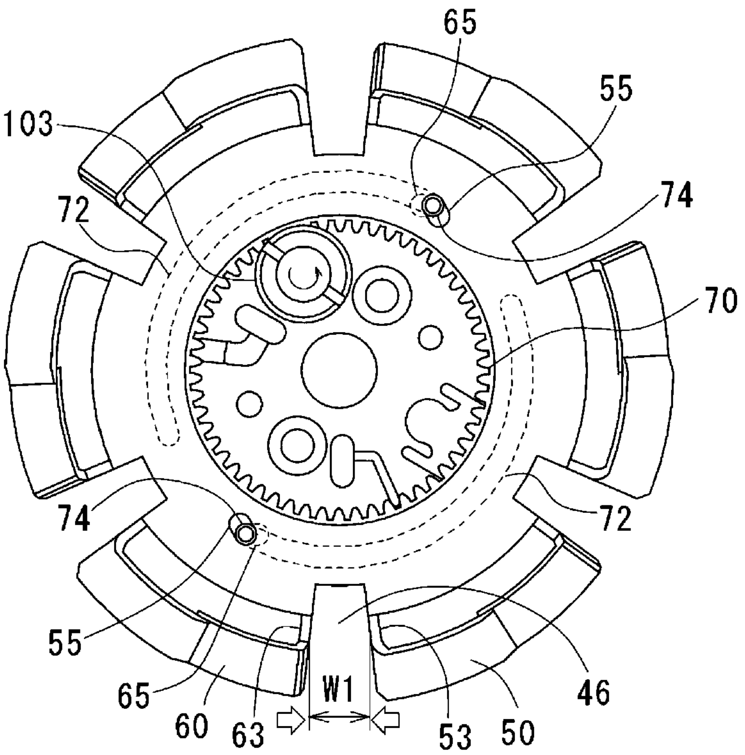
FIG. 19A is a planar view of the rotor adjusted for the small tablet and FIG. 19B is a planar view of the rotor adjusted for the large tablet.
Figure 19B:
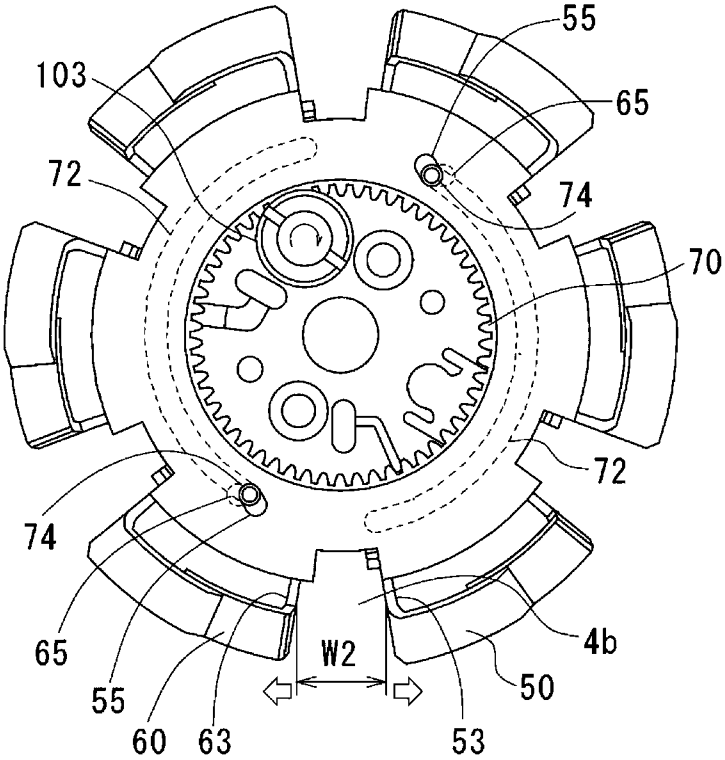
Figure 20A:
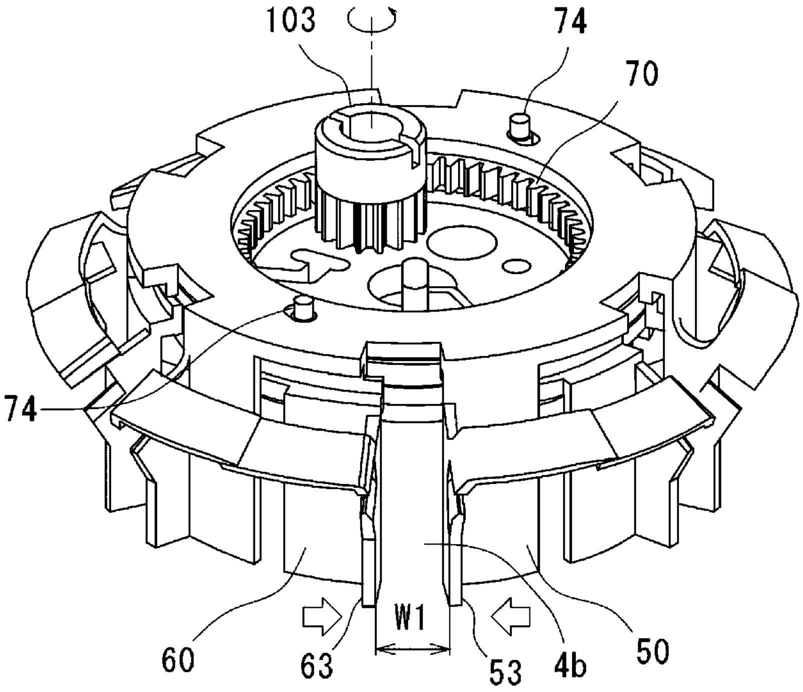
FIG. 20A is a perspective view of the rotor adjusted for the small tablet and FIG. 20B is a perspective view of the rotor adjusted for the large tablet.
Figure 20B:
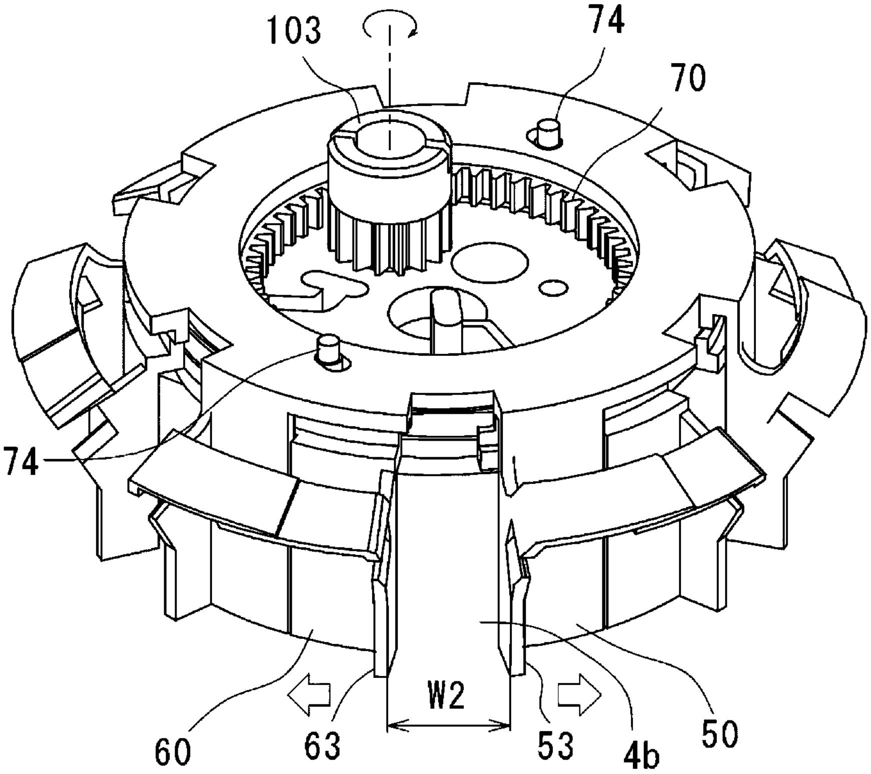

Namely, as shown in FIGS. 19A and 20A, when the cam member 70 rotates in the counterclockwise direction due to the rotation of the width adjusting screw 103 in the counterclockwise direction, the driving pins 74 move toward the outside, the first movable member 50 rotates in the clockwise direction and the second movable member 60 rotates in the counterclockwise direction. As a result, the distance between the first vertical protruding piece 53 of the first movable member 50 and the second vertical protruding piece 63 of the second movable member 60 decreases and thus the width of the tablet guide path 4*b* decreases to a width (W1). In contrast, as shown in FIGS. 19B and 20B, when the cam member 70 rotates in the clockwise direction due to the rotation of the width adjusting screw 103 in the clockwise direction, the driving pins 74 move toward the inner side, the first movable member 50 rotates in the counterclockwise direction and the second movable member 60 rotates in the clockwise direction. As a result, the distance between the first vertical protruding piece 53 of the first movable member 50 and the second vertical protruding piece 63 of the second movable member 60 increases and thus the width of the tablet guide path 4*b* increases to a width (W2). In this regard, in FIG. 12, since a tip end of the stopper 73 gets over the tooth of the driven gear 71 of the cam member 70 and is engaged between the teeth of the driven gear 71 every time when the cam member 70 rotates due to the rotation of the width adjusting screw 103, it is possible to stop the width adjusting screw 103 at an appropriate position and fix the width of the tablet guide path 4*b* between the first vertical protruding piece 53 of the first movable member 50 and the second vertical protruding piece 63 of the second movable member 60 to a desired width.

<Automatic Adjustment>

As described above, by rotating the thickness adjusting screw, the height adjusting screw and the width adjusting screw at the time of changing the kind of the tablet contained in the tablet cassette in the above-described embodiment, it is possible to adjust the depth, the height (the partitioning position) and the width of the tablet guide path so as to be adapted to the shape and the size of the tablet to smoothly discharge the tablet T. Since the depth, the height (the partitioning position) and the width of the tablet guide path are proportional to the rotational amounts of the thickness adjusting screw, the height adjusting screw and the width adjusting screw, it is possible to automatically perform adjusting operations for these parameters.

Figure 21:
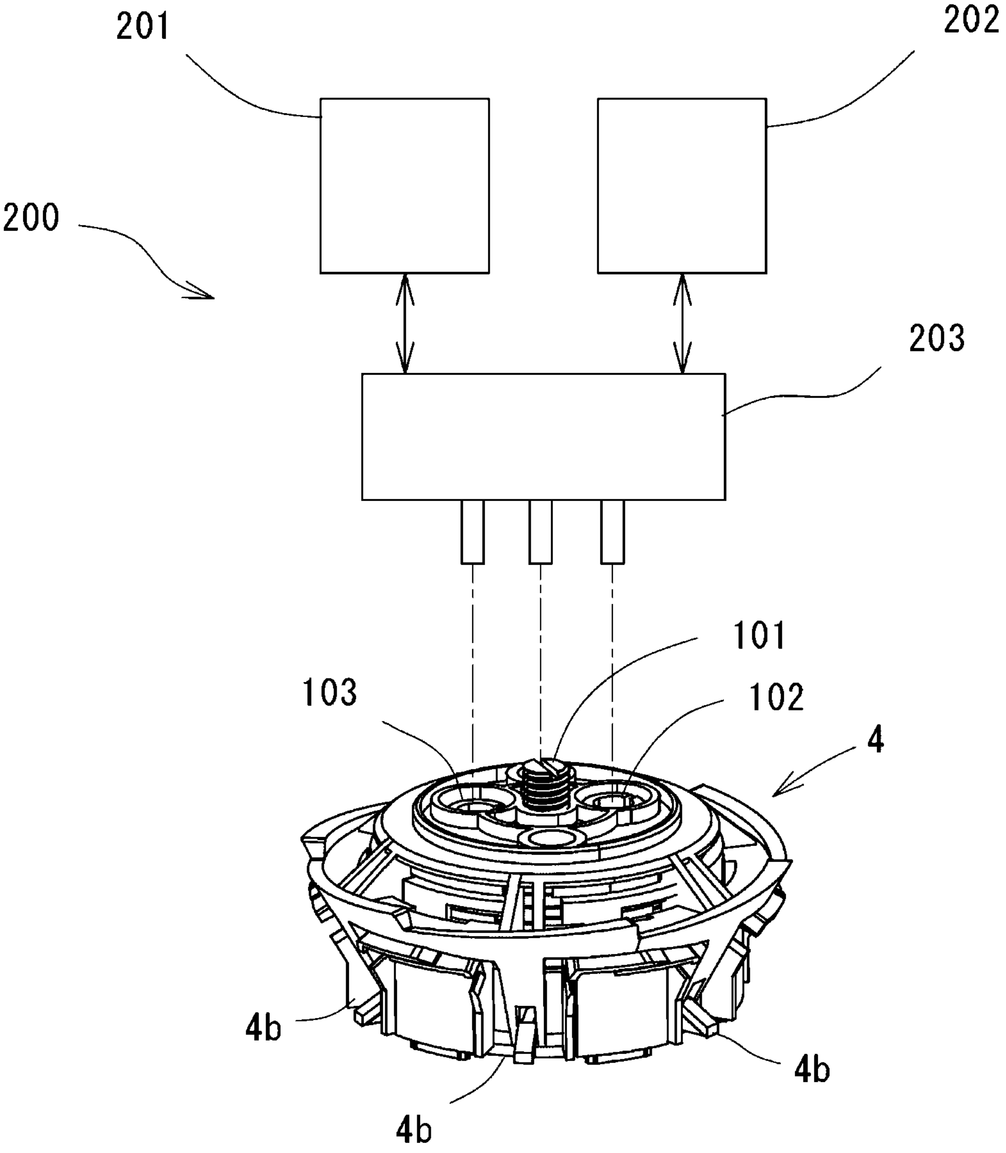
FIG. 21 is a schematic view of an automatically adjusting apparatus.

Namely, as shown in FIG. 21, there is provided an automatically adjusting apparatus 200 including a storage device 201 for storing proper values of the depth, the height (the partitioning position) and the width of the tablet guide path 4*b* of the rotor 4 for each kind of the tablet and the rotational amounts of the thickness adjusting screw 101, the height adjusting screw 102 and the width adjusting screw 103 corresponding to the proper values, an input device 202 for inputting the kind of the tablet and a driving device 203 for driving and rotating the thickness adjusting screw 101, the height adjusting screw 102 and the width adjusting screw 103. When the rotor 4 from which the rotor cover is removed is set to the automatically adjusting apparatus 200 and the kind of the tablet is inputted, the rotational amounts of the thickness adjusting screw 101, the height adjusting screw 102 and the width adjusting screw 103 are read from the storage device 201 depending on the kind of the tablet inputted into the input device 202 and then the thickness adjusting screw 101, the height adjusting screw 102 and the width adjusting screw 103 of the rotor 4 are rotated by the read rotational amounts to adjust the rotor 4 so as to have the tablet guide path 4*b* adapted to the tablet. This automatically adjusting apparatus 200 can be used not only for changing the kind of the tablet but also returning the rotor 4 in which the depth, the height (the partitioning position) and the width of the tablet guide path 4*b* are changed from the proper values during the use of the rotor 4 back to the proper values.

The above-described embodiment can be modified in various ways within the scope of the present invention described in the claims. For example, although the movable member moving mechanism of the above-described embodiment utilizes the cam mechanism for driving the first movable member 50 and the second movable member 60, it is possible to use other mechanisms not limited only to the cam mechanism. Hereinafter, description will be given to other modified examples of the movable member moving mechanism.

Modified Example 1 of the Movable Member Moving Mechanism

Figure 22:
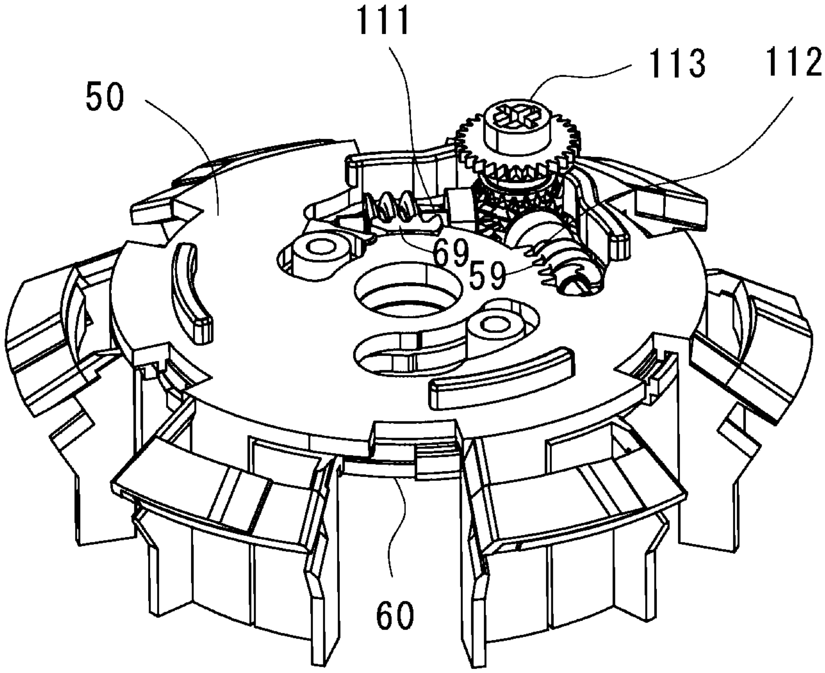
FIG. 22 is a perspective view showing a modified example 1 of the movable member moving mechanism.
Figure 23A:
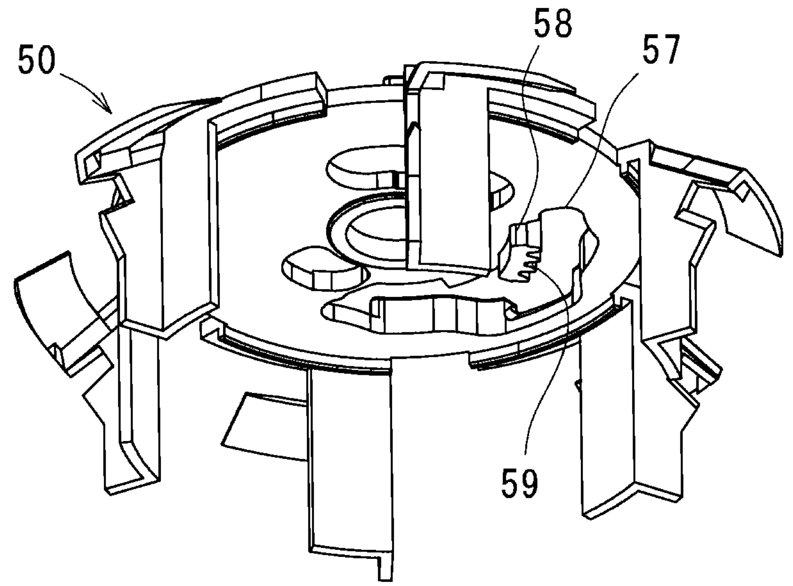
FIG. 23A is a perspective view of the first movable member seen from the diagonal lower side and FIG. 23B is a perspective view of the second movable member seen from the diagonal upper side.
Figure 23B:
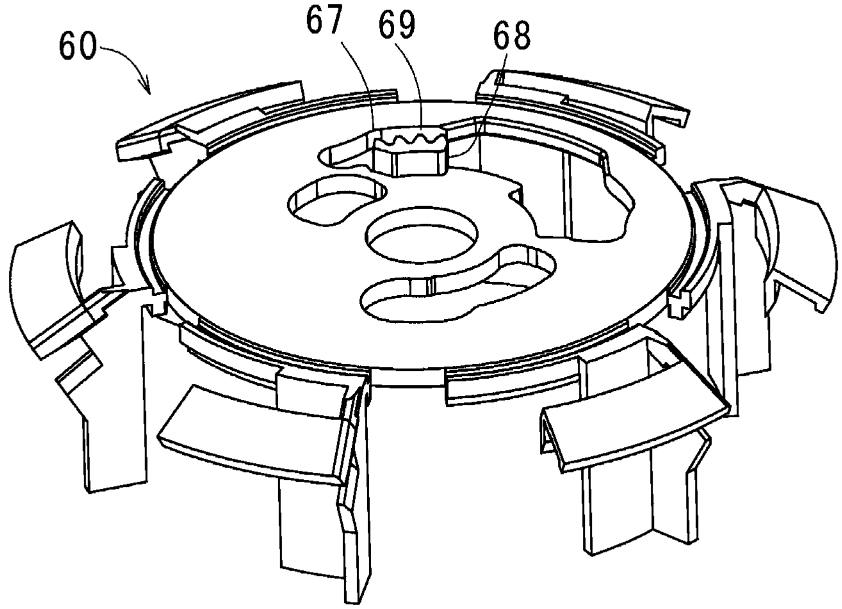

FIG. 22 shows a modified example in which a worm mechanism is used for driving the first movable member 50 and the second movable member 60. As shown in FIG. 23A, a cutout hole 57 is formed in the first movable member 50, a protruding portion 58 protruding toward the lower side is formed at an edge of the cutout hole 57 and a first segment worm gear 59 is formed at the protruding portion 58. In the same manner, as shown in FIG. 23B, a cutout hole 67 is formed in the second movable member 60, a protruding portion 68 protruding toward the upper side is formed at an edge of the cutout hole 67 and a second segment worm gear 69 is formed at the protruding portion 68. As shown in FIG. 22, the first segment worm gear 59 and the second segment worm gear 69 are formed so as to be positioned in a same plane and on a same pitch circle when the first movable member and the second movable member are overlapped with each other.

Figure 24:
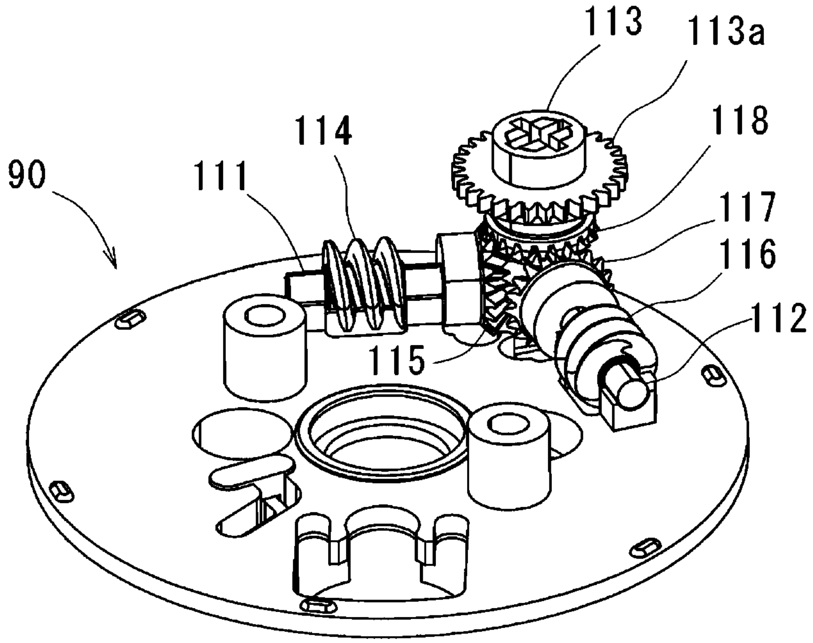
FIG. 24 is a perspective view of a second support member having a worm mechanism.

As shown in FIG. 24, a first transmission axis 111, a second transmission axis 112 and a width adjusting screw 113 are attached to the second support member 90. The first transmission axis 111 has a first worm 114 meshed with the first segment worm gear 59 in the middle thereof and a first driven bevel gear 115 on one end thereof. In the same manner, the second transmission axis 112 has a second worm 116 meshed with the second segment worm gear 69 in the middle thereof and a second driven bevel gear 117 on one end thereof. The first transmission axis 111 and the second transmission axis 112 are arranged so as to form an angle of about 100 degrees to make their driven bevel gears 115, 117 close to each other. The width adjusting screw 113 has a driving bevel gear 118 meshed with the first driven bevel gear 115 of the first transmission axis 111 and the second driven bevel gear 117 of the second transmission axis 112 on a lower end thereof and a gear portion 113*a* with which a stopper (not shown in the drawings) is latched on an upper portion thereof. Further, an upper end of the width adjusting screw 113 is exposed from the rotor main body 20 toward the upper side and can be operated.

When the width adjusting screw 113 is rotated in the left or right direction, the driving bevel gear 118 of the width adjusting screw 113 drives the first driven bevel gear 115 of the first transmission axis 111 and the second driven bevel gear 117 of the second transmission axis 112 and thus the first transmission axis 111 and the second transmission 112 rotate. With this movement, the first movable member 50 having the first segment worm gear 59 meshed with the first worm 114 of the first transmission axis 111 and the second movable member 60 having the second segment worm gear 69 meshed with the second worm 116 of the second transmission axis 112 rotate in directions opposite to each other. This makes it possible to enlarge and reduce a clearance between the first vertical protruding piece 53 of the first movable member 50 and the second vertical protruding piece 63 of the second movable member 60, that is the width of the tablet guide path 4*b*.

In this regard, although the width adjusting screw 113 shown in FIG. 22 meshes with the first driven bevel gear 115 of the first transmission axis 111 and the second driven bevel gear 117 of the second transmission axis 112 to rotate the first movable member 50 and the second movable member 60, it may be possible to take a configuration in which only the second transmission axis 112 is provided without providing the first transmission axis 111 and only the second movable member 60 is rotated or only the first transmission axis 111 is provided without providing the second transmission axis 112 and only the first movable member 50 is rotated.

Modified Example 2 of the Movable Member Moving Mechanism

Figure 25A:
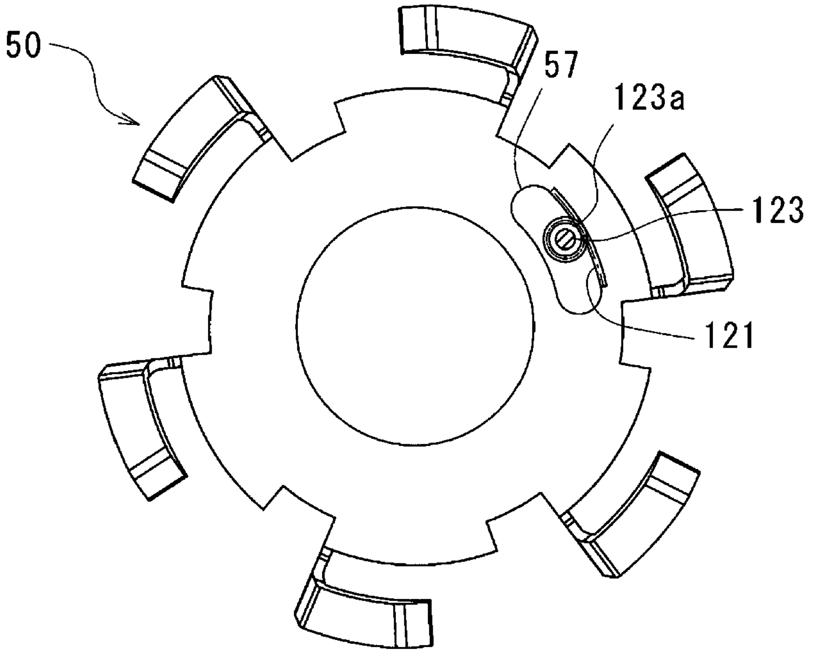
FIGS. 25A and 25B represent respectively planar views of the first movable member and the second movable member in a modified example 2 of the movable member moving mechanism.
Figure 25B:
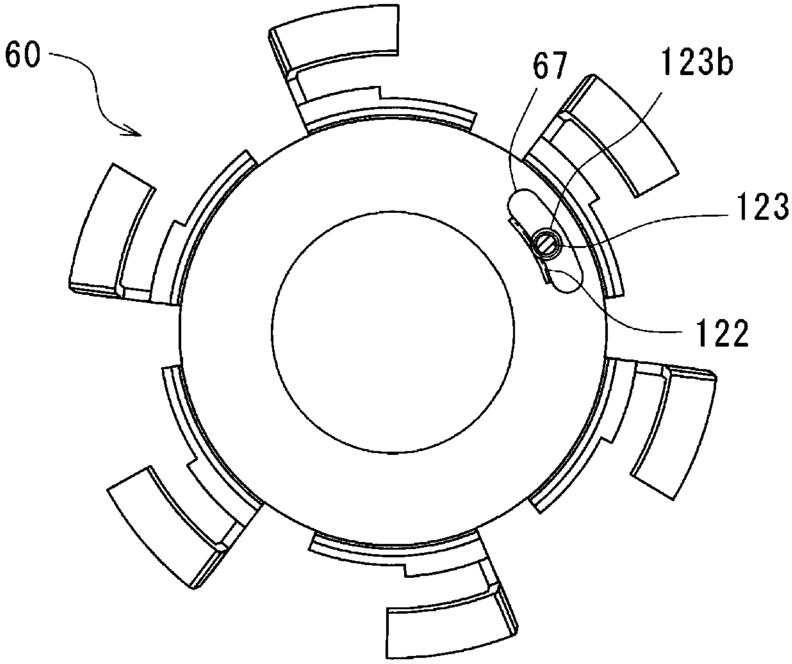

It is also possible to use a flat gear mechanism instead of the worm mechanism shown in FIG. 22. Namely, as shown in FIGS. 25A and 25B, a first segment gear 121 of the first movable member 50 and a second segment gear 122 of the second segment gear 122 are formed so as to face each other. A first driving gear 123*a* meshed with the first segment gear 121 of the first movable member 50 and a second driving gear 123*b* meshed with the second segment gear 122 of the second movable member 60 are provided on the width adjusting screw 123.

When the width adjusting screw 123 is rotated in the left or right direction, the first movable member 50 having the first segment gear 121 meshed with the first driving gear 123*a* of the width adjusting screw 123 and the second movable member 60 having the second segment gear 122 meshed with the second driving gear 123*b* of the width adjusting screw 123 rotate in directions opposite to each other. With this movement, it is possible to enlarge and reduce a clearance between the first vertical protruding piece 53 of the first movable member 50 and the second vertical protruding piece 63 of the second movable member 60, which is the width of the tablet guide path 4*b*. In this regard, it is preferable that reduction gears are interposed between the first driving gear 123*a* and the first segment gear 121 and between the second driving gear 123*b* and the second segment gear 122 in order to enable fine adjustment with the width adjusting screw 123 and improve a resolution performance.

In this regard, although the width adjusting screw 123 shown in FIGS. 25A and 25B includes the first driving gear 123*a* and the second driving gear 123*b* to rotate the first movable member 50 and the second movable member 60, it may be possible to take a configuration in which the first driving gear 123*a* is not provided and only the second movable member 60 is rotated by the second driving gear 123*b* or the second driving gear 123*b* is not provided and only the first movable member 50 is rotated by the first driving gear 123*a*.

Modified Example 3 of the Movable Member Moving Mechanism

Figure 26A:
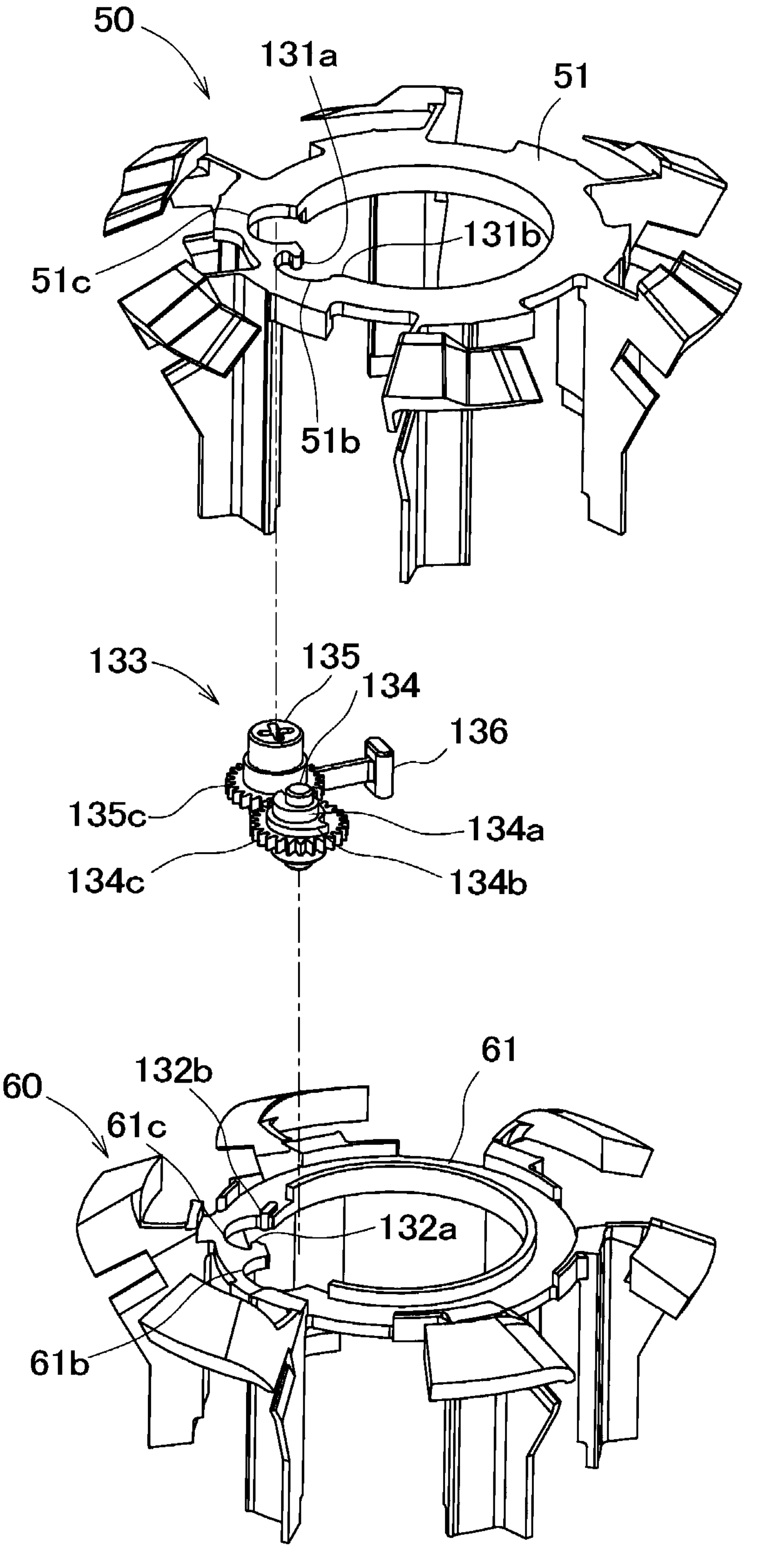
FIG. 26A is an exploded perspective view of the movable member moving mechanism in a modified example 3 and FIG. 26B is a front view of an adjusting screw.
Figure 26B:
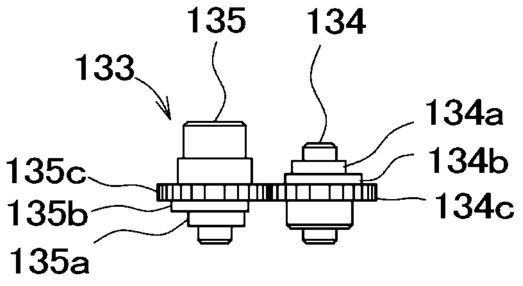

FIGS. 26A and 26B shows a modified example in which a double-cam mechanism is used for driving the first movable member 50 and the second movable member 60.

Two substantially semicircle-shaped cutouts 51*b*, 51*c* are formed in an inner periphery of the annular base portion 51 of the first movable member 50 so as to be adjacent to each other. An A protrusion 131*a* and a B protrusion 131*b* facing to each other in the circumferential direction of the first movable member 50 are formed in an edge of the cutout 51*b* positioned on the upper stream side of the clockwise direction when the first movable member 50 is seen from the upper side. The A protrusion 131*a* and the B protrusion 131*b* serve as a cam follower slidably contacting with an A cam 134*a* and a B cam 134*b* of a first adjusting axis 134 described later.

In the same manner, two substantially semicircle-shaped cutouts 61*b*, 61*c* are formed in an inner periphery of the annular base portion 61 of the second movable member 60 so as to be adjacent to each other. An A protrusion 132*a* and a B protrusion 132*b* facing to each other in the circumferential direction of the second movable member 60 are formed in an edge of the cutout 61*c* positioned on the downstream side of the clockwise direction when the second movable member 60 is seen from the upper side. The A protrusion 132*a* and the B protrusion 132*b* serve as a cam follower slidably contacting with an A cam 135*a* and a B cam 135*b* of a second adjusting axis 135 described later.

The width adjusting screw 133 is constituted of the first adjusting axis 134 and the second adjusting axis 135. The first adjusting axis 134 is arranged in the cutouts 51*b*, 61*b* overlapped with each other and positioned on the upper stream side of the clockwise direction when the first movable member 50 and the second movable member 60 are seen from the upper side. The second adjusting axis 135 is arranged in the cutouts 51*c*, 61*c* overlapped with each other and positioned on the downstream side of the clockwise direction when the first movable member 50 and the second movable member 60 are seen from the upper side. A stopper 136 for preventing free rotation of the width adjusting screw 133 is provided at the second adjusting axis 135.

Figure 27A:
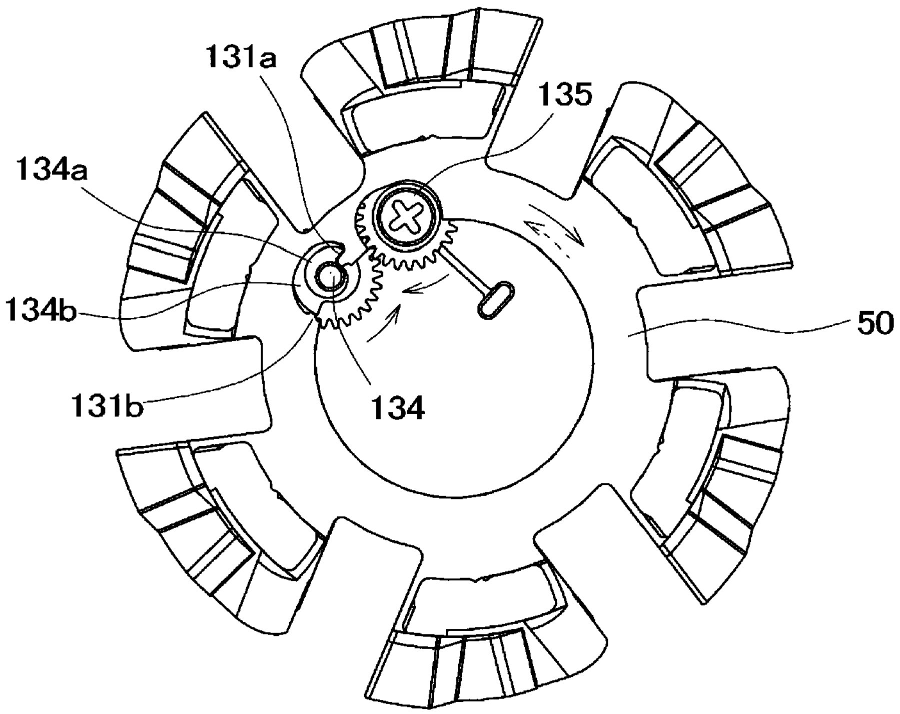
FIG. 27A is a planar view of the movable member moving mechanism shown in FIG. 26 seen from the side of the first movable member and FIG. 27B is a lower surface view of the movable member moving mechanism shown in FIG. 26 seen from the side of the second movable member.

The A cam 134*a*, the B cam 134*b* and a gear 134*c* are formed on the first adjusting axis 134 in this order from an upper end of the first adjusting axis 134. As shown in FIG. 27A, the A cam 134*a* is formed so that a radius of a cam surface thereof increases within the range of 360 degrees in the clockwise direction when the width adjusting screw 133 is seen from the upper side and the A cam 134*a* slidably contacts with the A protrusion 131*a* of the first movable member 50. The B cam 134*b* is formed so that a radius of a cam surface thereof increases within the range of 360 degrees in the counterclockwise direction when the width adjusting screw 133 is seen from the upper side and the B cam 134*b* slidably contacts with the B protrusion 131*b* of the first movable member 50. A maximum radius portion of the A cam 134*a* and a maximum radius portion of the B cam 134*b* are positioned so as to be away from each other by 180 degrees. The upper end of the first adjusting axis 134 is supported by the first support member 80 and a lower end of the first adjusting axis 134 is supported by the second support member 90.

Figure 27B:
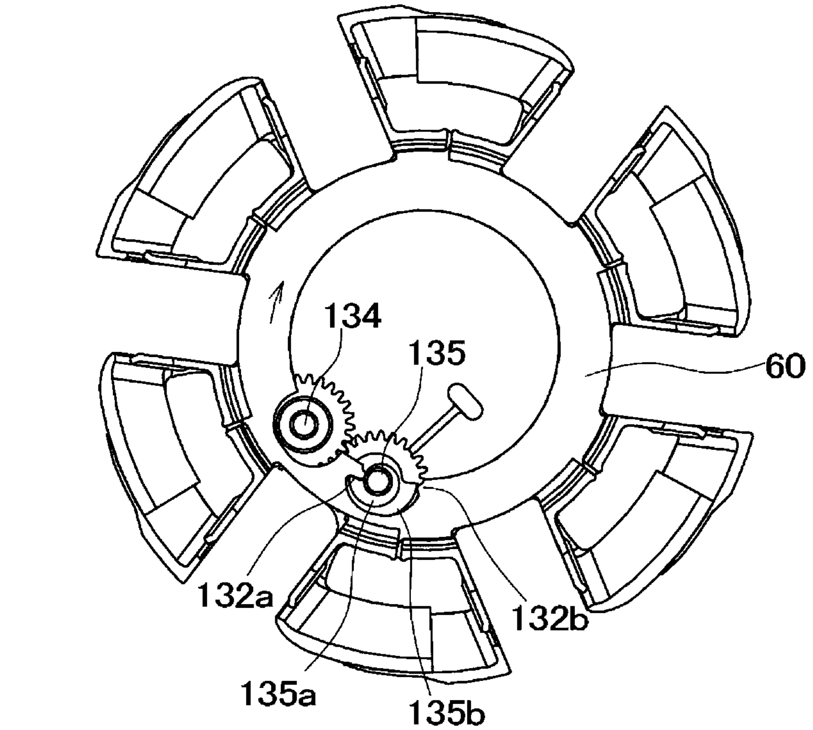

In the same manner, the A cam 135*a*, the B cam 135*b* and a gear 135*c* are formed on the second adjusting axis 135 in this order from a lower end of the second adjusting axis 135. As shown in FIG. 27B, the A cam 135*a* is formed so that a radius of a cam surface thereof increases within the range of 360 degrees in the clockwise direction when the width adjusting screw 133 is seen from the lower side and the A cam 135*a* slidably contacts with the A protrusion 132*a* of the second movable member 60. The B cam 135*b* is formed so that a radius of a cam surface thereof increases with in the range of 360 degrees in the counterclockwise direction when the width adjusting screw 133 is seen from the lower side and the B cam 135*b* slidably contacts with the B protrusion 132*b* of the second movable member 60. A maximum radius portion of the A cam 135*a* and a maximum radius portion of the B cam 135*b* are positioned so as to be away from each other by 180 degrees. The gear 135*c* of the second adjusting axis is configured to mesh with the gear 134*c* to interlock with the gear 134*c*. An upper end of the second adjusting axis 135 passes through the first support member 80 and is exposed from the rotor main body 20 to the outside so that the second adjusting axis 135 can be adjusted from the outside by rotating the second adjusting axis 135. The lower end of the second adjusting axis 135 is supported by the second support member 90. In this regard, it may be possible to take a configuration in which the upper end of the first adjusting axis 134 passes through the first support member 80, protrudes from the rotor main body 20 and is exposed to the outside so that the first adjusting axis 134 can be adjusted from the outside by rotating the first adjusting axis 134.

When the second adjusting axis 135 is rotated in the clockwise direction in FIG. 27A, rotational force is transmitted from the gear 135*c* of the second adjusting axis 135 to the gear 134*c* of the first adjusting axis 134 and thus the first adjusting axis 134 rotates in the counterclockwise direction. Since the A cam 134*a* of the first adjusting axis 134 slidably contacts with and presses the A protrusion 131*a* of the first movable member 50 due to the rotation of the first adjusting axis 134, the first movable member 50 pivotally moves in the clockwise direction in FIG. 27A. On the other hand, since the A cam 135*a* of the second adjusting axis 135 slidably contacts with and presses the A protrusion 132*a* of the second movable member 60 due to the rotation of the second adjusting axis 135 as shown in FIG. 27B, the second movable member 60 rotates in the counterclockwise direction in FIG. 27A.

Subsequently, when the second adjusting axis 135 is rotated in the counterclockwise direction in FIG. 27A, rotational force is transmitted form the gear 135*c* of the second adjusting axis 135 to the gear 134*c* of the first adjusting axis 134 and thus the first adjusting axis 134 rotates in the clockwise direction. Since the B cam 134*b* of the first adjusting axis 134 slidably contacts with and presses the B protrusion 131*b* of the first movable member 50 due to the rotation of the first adjusting axis 134, the first movable member 50 pivotally moves in the counterclockwise direction in FIG. 27A. On the other hand, since the B cam 135*b* of the second adjusting axis 135 slidably contacts with and presses the B protrusion 132*b* of the second movable member 60 due to the rotation of the second adjusting axis 135 as shown in FIG. 27B, the second movable member 60 pivotally moves in the clockwise direction in FIG. 27A.

As described above, the first movable member 50 and the second movable member 60 rotate in the directions opposite to each other and thus it is possible to enlarge and reduce the clearance between the first vertical protruding piece 53 of the first movable member 50 and the second vertical protruding piece 63 of the second movable member 60, that is the width of the tablet guide path 4*b*.

In this regard, although the width adjusting screw 133 shown in FIGS. 26A and 26B is constituted of the first adjusting axis 134 and the second adjusting axis 135, it may be possible to take a configuration in which the first adjusting axis 134 is not provided and only the second movable member 60 is rotated by the second adjusting axis 135 or the second adjusting axis 135 is not provided and only the first movable member 50 is rotated by the first adjusting axis 134.

Modified Example of the Rotor Main Body

Figure 28:
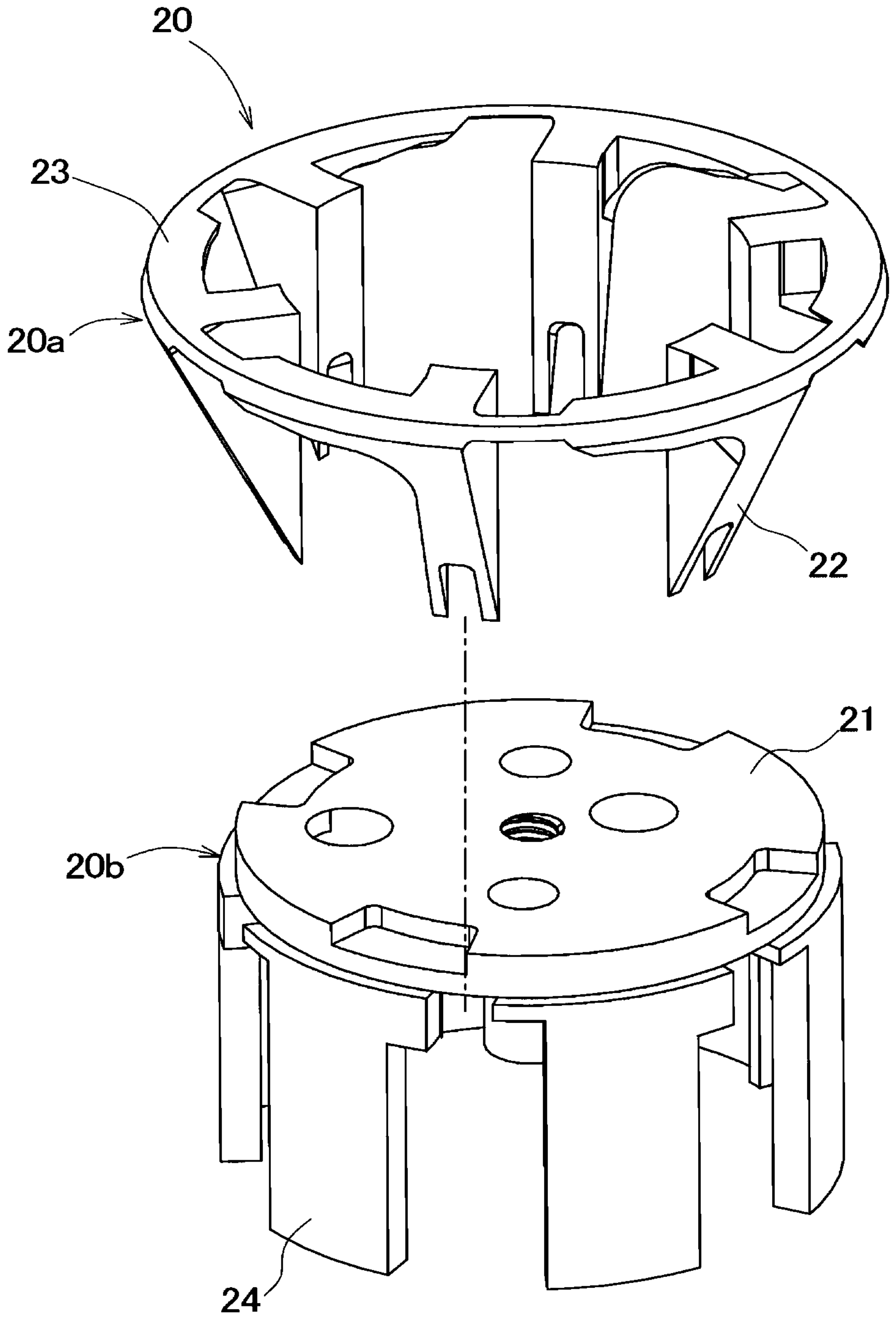
FIG. 28 is an exploded perspective view showing a modified example of the rotor main body.

Although the rotor main body 20 shown in FIG. 7 is integrally formed, the rotor main body 20 may be configured so that a first portion 20*a* constituted of the downwardly protruding portions 22 and the annular portion 23 and a second portion 20*b* constituted of the base portion 21 and the guide portions 24 are formed as respectively different members as shown in FIG. 28.

While the principles of the disclosure have been described above in connection with specific apparatuses, it is to be clearly understood that this description is made only by way of example and not as limitation on the scope of the invention.

What is claimed is:

1. A rotor which is rotatably contained in a cassette main body for containing tablets and has a plurality of tablet guide paths for guiding the tablets in the cassette main body to a tablet discharging hole provided in the cassette main body, wherein a tablet is partitioned from other tablets by a partitioning member provided on an upper side of the tablet discharging hole of the cassette main body, the rotor includes:

a tablet support table for supporting a lowest tablet in the tablet guide path, and a tablet support table raising and lowering mechanism for raising and lowering the tablet support table, a distance between the partitioning member and the tablet support table can be adjusted by the tablet support table raising and lowering mechanism, wherein the rotor includes a rotor base and a rotor main body provided so as to rotate around a rotational axis of the rotor integrally with the rotor base, the tablet support table raising and lowering mechanism includes:

a rotating member which is provided on the rotor base and in which a screw portion is formed on an outer periphery and a driven gear is formed on an inner periphery, a raising and lowering member which is provided on the rotor base so that the raising and lowering member can be raised and lowered and has the tablet support table and a screw hole screwed with the screw portion of the rotating member, and a height adjusting member whose driving gear on one end thereof is meshed with the driven gear of the rotating member and an other end is exposed from the rotor main body.

2. A rotor which is rotatably contained in a cassette main body for containing tablets and has a plurality of tablet guide paths for guiding the tablets in the cassette main body to a tablet discharging hole provided in the cassette main body, wherein a tablet is partitioned from other tablets by a partitioning member provided on an upper side of the tablet discharging hole at a part of the rotor in a circumferential direction, after partitioning the tablet, the rotor includes a tablet support table for supporting only the tablet partitioned from other tablets in the tablet guide path, and the tablet support table forms a lower end surface of the tablet guide path and rotates together with the rotor relative to the partitioning member.

3. The rotor as claimed in claim 2, wherein the tablet support table has an inclined surface for supporting the lowest tablet below the partitioning member and is formed so that the tablet falls down on the inclined surface and is discharged from the tablet discharging hole.

4. A tablet cassette containing the rotor as defined by claim 2.

* * * * *